United States Patent
Kim et al.

(10) Patent No.: US 10,514,758 B2
(45) Date of Patent: *Dec. 24, 2019

(54) VISIBILITY IMPROVEMENT METHOD BASED ON EYE TRACKING, MACHINE-READABLE STORAGE MEDIUM AND ELECTRONIC DEVICE

(71) Applicant: SAMSUNG ELECTRONICS CO., LTD., Suwon-si (KR)

(72) Inventors: Myung-Sik Kim, Gyeonggi-do (KR); Chang-Yeong Kim, Seoul (KR); Ick-Sang Han, Gyeonggi-do (KR); Joon-Oo Kim, Gyeonggi-do (KR); Jinho Kim, Gyeonggi-do (KR); Yun-Je Oh, Gyeonggi-do (KR); Sun-Tae Jung, Gyeonggi-do (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/266,978

(22) Filed: Feb. 4, 2019

(65) Prior Publication Data

US 2019/0179410 A1 Jun. 13, 2019

Related U.S. Application Data

(63) Continuation of application No. 15/853,277, filed on Dec. 22, 2017, now Pat. No. 10,203,754, which is a (Continued)

(30) Foreign Application Priority Data

Jun. 11, 2013 (KR) ........................ 10-2013-0066578

(51) Int. Cl.
*G09G 1/00* (2006.01)
*G06F 3/01* (2006.01)
(Continued)

(52) U.S. Cl.
CPC .......... *G06F 3/013* (2013.01); *G02B 27/017* (2013.01); *G06F 3/04842* (2013.01);
(Continued)

(58) Field of Classification Search
CPC . G06F 3/048; G06F 3/017; G06F 3/01; G06F 3/013; G06F 3/11; G06F 15/16; G02B 27/01; G02B 27/017; G09G 1/00
See application file for complete search history.

(56) References Cited

U.S. PATENT DOCUMENTS 7,068,813 B2 6/2006 Lin
8,913,004 B1 12/2014 Bozarth et al.
(Continued)

FOREIGN PATENT DOCUMENTS

CN 102063249 5/2011
CN 102301316 12/2011
(Continued)

OTHER PUBLICATIONS

European Search Report dated Nov. 6, 2014 issued in counterpart application No. 14171946.8-1959.
(Continued)

*Primary Examiner* — Michael A Faragalla
(74) *Attorney, Agent, or Firm* — Sughrue Mion, PLLC

(57) ABSTRACT

A visibility improvement method using gaze tracking includes detecting a gaze of a user using a camera; determining a focus object at which the user gazes from among at least one object viewed through a display unit of an electronic device; and displaying, on the display unit, an image with high visibility that corresponds to the focus object and has higher visibility than the focus object.

27 Claims, 23 Drawing Sheets

Related U.S. Application Data continuation of application No. 14/294,775, filed on Jun. 3, 2014, now Pat. No. 9,851,788.

(51) Int. Cl.
*G02B 27/01* (2006.01)
*G06F 3/0484* (2013.01)

(52) U.S. Cl.
CPC .......... *G02B 2027/014* (2013.01); *G02B 2027/0127* (2013.01); *G02B 2027/0138* (2013.01); *G02B 2027/0187* (2013.01); *G06F 2203/04806* (2013.01)

(56) References Cited

U.S. PATENT DOCUMENTS

| | | | |
|---|---|---|---|
| 9,164,583 | B2 | 10/2015 | Williams et al. |
| 10,055,889 | B2 | 8/2018 | Bar-Zeev et al. |
| 2002/0141614 | A1 | 10/2002 | Lin |
| 2005/0207725 | A1 | 9/2005 | Sako et al. |
| 2009/0175551 | A1* | 7/2009 | Thorn ............ G06T 5/00 382/254 |
| 2011/0006978 | A1 | 1/2011 | Yuan |
| 2011/0115883 | A1 | 5/2011 | Kellerman et al. |
| 2011/0175932 | A1* | 7/2011 | Yu ............ G06F 3/013 345/661 |
| 2011/0254865 | A1 | 10/2011 | Yee et al. |
| 2011/0273369 | A1 | 11/2011 | Imai et al. |
| 2011/0298702 | A1* | 12/2011 | Sakata ............ G06F 3/013 345/156 |
| 2012/0092369 | A1 | 4/2012 | Kim et al. |
| 2012/0256967 | A1 | 10/2012 | Baldwin et al. |
| 2013/0050432 | A1* | 2/2013 | Perez ............ G02B 27/017 348/47 |
| 2013/0117377 | A1 | 5/2013 | Miller |

FOREIGN PATENT DOCUMENTS

| | | |
|---|---|---|
| KR | 20030007708 | 1/2003 |
| KR | 102006002710 | 1/2006 |
| KR | 1020110035162 | 4/2011 |
| KR | 1020110040199 | 4/2011 |
| KR | 10-2011-0114114 A | 10/2011 |
| KR | 1020120027507 | 3/2012 |
| KR | 1020120127790 | 11/2012 |
| KR | 1020130010012 | 1/2013 |
| KR | 10-1789357 B1 | 10/2017 |

OTHER PUBLICATIONS

European Search Report dated Jan. 28, 2016 issued in counterpart application No. 14171946.8-1959, 13 pages.

Chinese Office Action dated Dec. 25, 2017 issued in counterpart Application No. 201410257721.0, 22 pages.

Oreskovic, A., "Google deploying planes over cities for 3D maps", Jun. 6, 2012, XP55502079, http://www.reuters.com/article/us-google-maps/google-deploying-planes-over-cities-for-3d-maps-idUSBRE85516020120606, 6 pages total.

iDb: "Maps Wars Apple 3D Maps (iOS 6) vs Google Earth 3D Buildings", Aug. 9, 2012, XP54978633, https://www.youtube.com/watch?v=_7BBOVeeSBE, 1 page total.

Communication dated Sep. 4, 2018, issued by the European Patent Office in counterpart European Application No. 18163361.1.

* cited by examiner

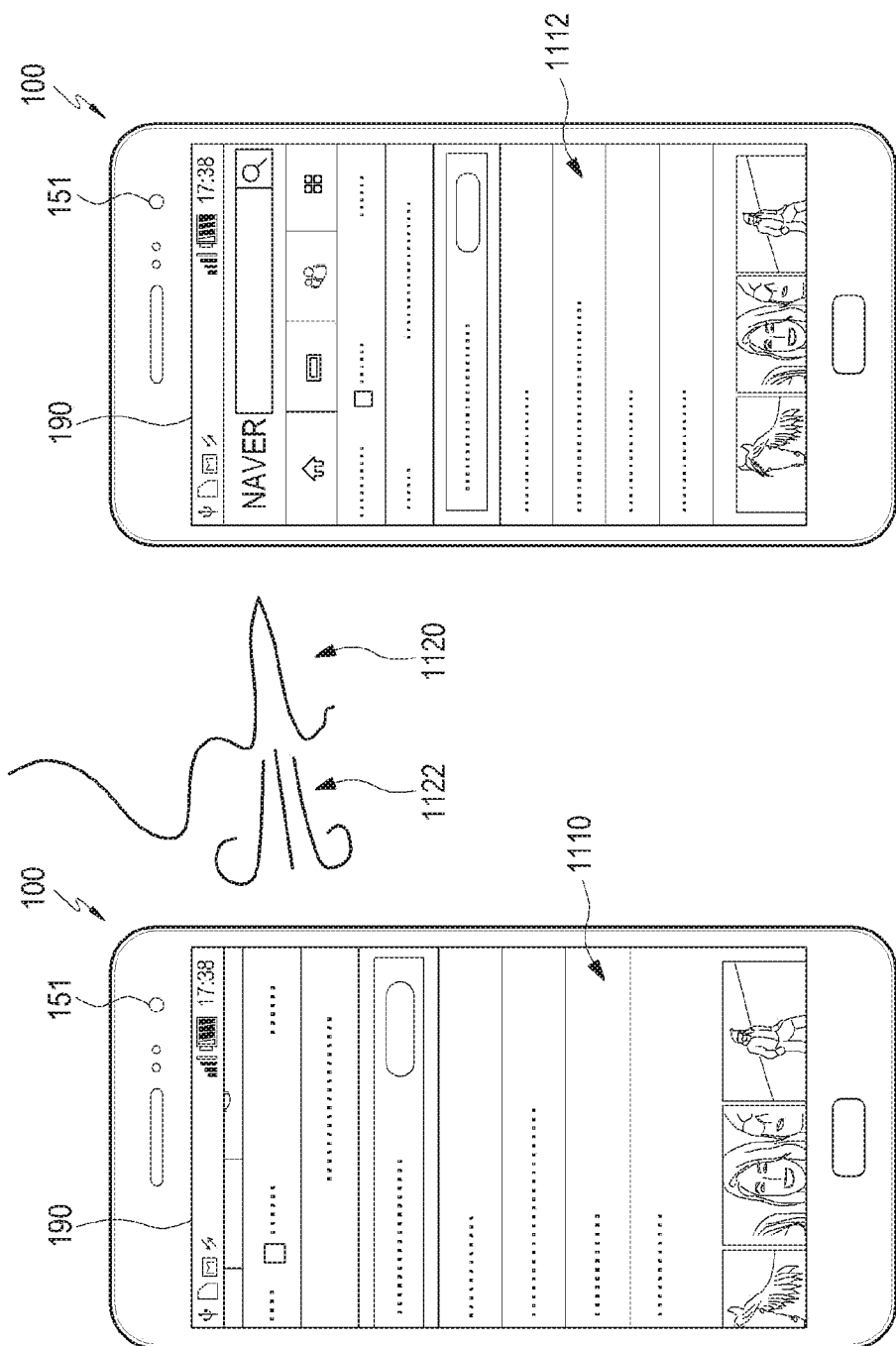

VISIBILITY IMPROVEMENT METHOD BASED ON EYE TRACKING, MACHINE-READABLE STORAGE MEDIUM AND ELECTRONIC DEVICE

CROSS-REFERENCE TO RELATED APPLICATIONS

This application is a continuation of U.S. patent application Ser. No. 15/853,277, which was filed on Dec. 22, 2017, in the U.S. Patent and Trademark Office, which is a continuation of U.S. patent application Ser. No. 14/294,775, which was filed on Jun. 3, 2014, in the U.S. Patent and Trademark Office, now U.S. Pat. No. 9,851,788 issued on Dec. 26, 2017, and claims priority under 35 U.S.C. § 119(a) to Korean Patent Application Serial No. 10-2013-0066578, which was filed in the Korean Intellectual Property Office on Jun. 11, 2013, the entire contents of all of which are incorporated herein by reference.

BACKGROUND

1. Field of the Invention

The present invention generally relates to a method for processing an image photographed by a camera, and more particularly, to a method for processing an image based on the gaze of a user.

2. Description of the Related Art

Conventionally, as gaze tracking technology using a camera has developed, a technology has emerged which provides information customized to the interests of users by means of tracking the gaze of a user so as to enlarge or reduce an object which is displayed on a screen and being focused on, or to display related information around the object being focused on.

For example, there may be a technology that tracks the gaze of a user and enlarges or reduces a predetermined portion when the user gazes at the predetermined portion on the screen.

As another example, information associated with each player may be displayed when a user gazes at players on a playground, or information associated with ancient artifacts may be displayed in a historical site. The conventional technology provides a user with detailed information by enlarging a predetermined area or displaying related text information when a user focuses on the predetermined area. However, when an image displayed on a screen or photographed in an environment where the user actually gazes at an object through a camera attached onto a face, or the like has a low resolution, or the image is dark due to an insufficient amount of ambient light, or the image is unclear due to insufficient exposure, or a distance to a desired object such as a sign or the like is distant, the conventional technology has difficulty in providing a user with the desired visual information even though it enlarges the image.

Also, a technology that displays information associated with a target object through texts may provide detailed information which does not appear in visual information but may not provide detailed visual information such as an appearance, a color, or the like of an actual object.

SUMMARY

The present invention has been made to at least partially solve, reduce, or remove at least one of the problems and/or disadvantages related to the conventional art, and to provide at least the advantages described below. Accordingly, an aspect of the present invention is to improve an information providing method that enlarges an existing image and displays text information, and to provide a high-visibility image by tracking a gaze of a user, determining a focus object, reproducing an image or replacing the image with a related image or the like, so as to enable the user to readily identify the object and to provide the user with plenty of visual information.

In accordance with an aspect of the present invention, there is provided a method of improving visibility using gaze tracking, the method including detecting a gaze of a user using a camera; determining a focus object at which the user gazes from among at least one object viewed through a display unit of an electronic device or an object in an extended line of the gaze of the user in a transparent display or the like; and displaying, on the display unit, an image with high visibility that corresponds to the focus object and has a higher visibility than the focus object.

In accordance with another aspect of the present invention, there is provided an electronic device, including a camera that photographs an eye of a user; a display unit that displays at least one object; and a controller that detects a gaze of a user from the photographed eye of the user, determines a focus object at which the user gazes from among the at least one object, and displays, through the display unit, an image with high visibility that corresponds to the focus object and has a higher visibility than the focus object.

In accordance with another aspect of the present invention, there is provided a machine-readable storage medium having a program recorded thereon, which when executed, performs a method of improving visibility using gaze tracking, the method including detecting a gaze of a user using a camera; determining a focus object at which the user gazes from among at least one object viewed through a display unit of an electronic device; and displaying, on the display unit, an image with high visibility that corresponds to the focus object and has higher visibility than the focus object.

In accordance with another aspect of the present invention, there is provided an electronic device including a machine-readable storage medium having recorded thereon a program, which when executed, performs a method of improving visibility using gaze tracking, the method including detecting a gaze of a user using a camera; determining a focus object at which the user gazes from among at least one object viewed through a display unit of an electronic device; and displaying, on the display unit, an image with high visibility that corresponds to the focus object and has higher visibility than the focus object.

In accordance with another aspect of the present invention, there is provided a wearable electronic device including means for positioning the wearable electronic device on a user's body; at least one camera that photographs an eye of the user; at least one display unit that displays at least one object; and a controller configured to detect a gaze from the photographed eye of the user, determine a focus object at which the user gazes from among the at least one object, and display, through the display unit, an image with high visibility that corresponds to the focus object and has higher visibility than the focus object.

BRIEF DESCRIPTION OF THE DRAWINGS

The above and other aspects, features, and advantages of the present invention will be more apparent from the following detailed description taken in conjunction with the accompanying drawings, in which:

FIGS. 21A and 21B illustrate a method of interrupting the display of a high-visibility image according to an embodiment of the present invention;

DETAILED DESCRIPTION OF EMBODIMENTS OF THE PRESENT INVENTION

Figure 1:
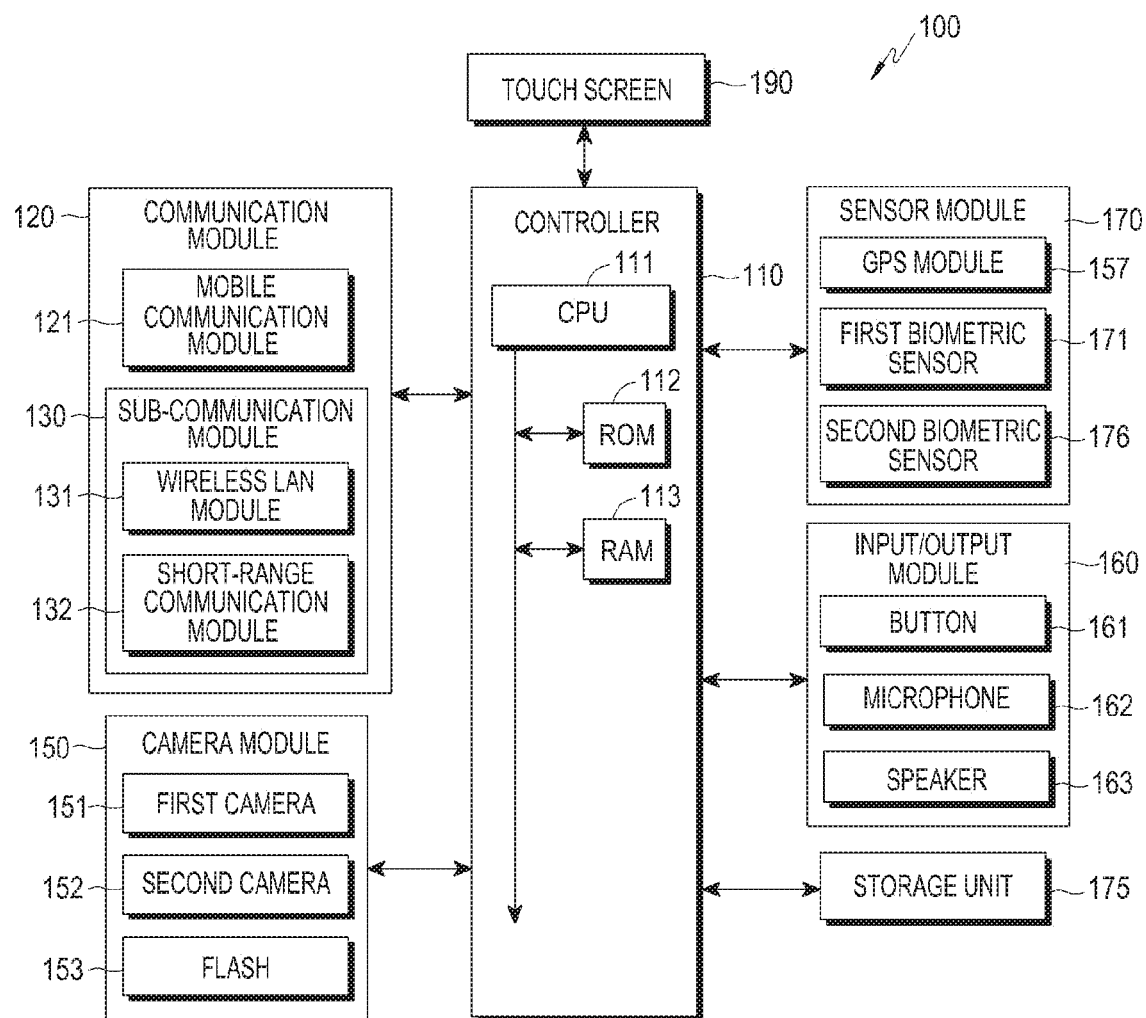
FIG. 1 is a block diagram illustrating a first electronic device according to a first embodiment of the present invention.

The present invention may have various modifications and various embodiments, among which specific embodiments will now be described more fully with reference to the accompanying drawings. However, it should be understood that there is no intent to limit the present invention to the specific embodiments, but on the contrary, the present invention covers all modifications, equivalents, and alternatives falling within the scope of the description herein.

Although terms including an ordinal number such as first, second, etc. can be used for describing various elements, the elements are not restricted by the terms. The terms are only used to distinguish one element from another element. For example, without departing from the scope of the present invention, a first structural element may be referred to as a second structural element. Similarly, the second structural element also may be referred to as the first structural element. As used herein, the term "and/or" includes any and all combinations of one or more of the associated listed items.

The terms used in this application are for the purpose of describing particular embodiments only and are not intended to limit the invention. Singular forms are intended to include plural forms unless the context clearly indicates otherwise. In the description, it should be understood that the terms "include" or "have" indicate existences of a feature, a number, a step, an operation, a structural element, parts, or a combination thereof, and do not previously exclude the existences or probability of addition of one or more another features, numeral, steps, operations, structural elements, parts, or combinations thereof.

Unless defined differently, all terms used herein, which include technical terminologies or scientific terminologies, have the same meaning as understood by a person skilled in the art to which the present invention belongs. Such terms as those defined in a generally used dictionary are to be interpreted to have the meanings equal to the contextual meanings in the relevant field of art, and are not to be interpreted to have ideal or excessively formal meanings unless clearly defined in the present specification.

The electronic device of the present invention may be a certain device, and may be referred to as a portable device, a mobile terminal, a communication terminal, a portable communication terminal, a portable and mobile terminal and so on.

For example, the electronic device may be a smartphone, a portable phone, a game player, a TV, a display unit, a heads-up display unit for a vehicle, a notebook computer, a laptop computer, a tablet Personal Computer (PC), a Personal Media Player (PMP), a Personal Digital Assistant (PDA), or the like. An electronic device may be embodied as a pocket-sized portable communication terminal or an attachable communication terminal including a wireless communication function. Also, the electronic device may be a flexible device, a flexible display device, a transparent display device, or the like.

An electronic device according to the embodiments of the present invention is a portable terminal, and a few component elements may be omitted or changed in a representative configuration of the electronic device as necessary.

Figure 2:
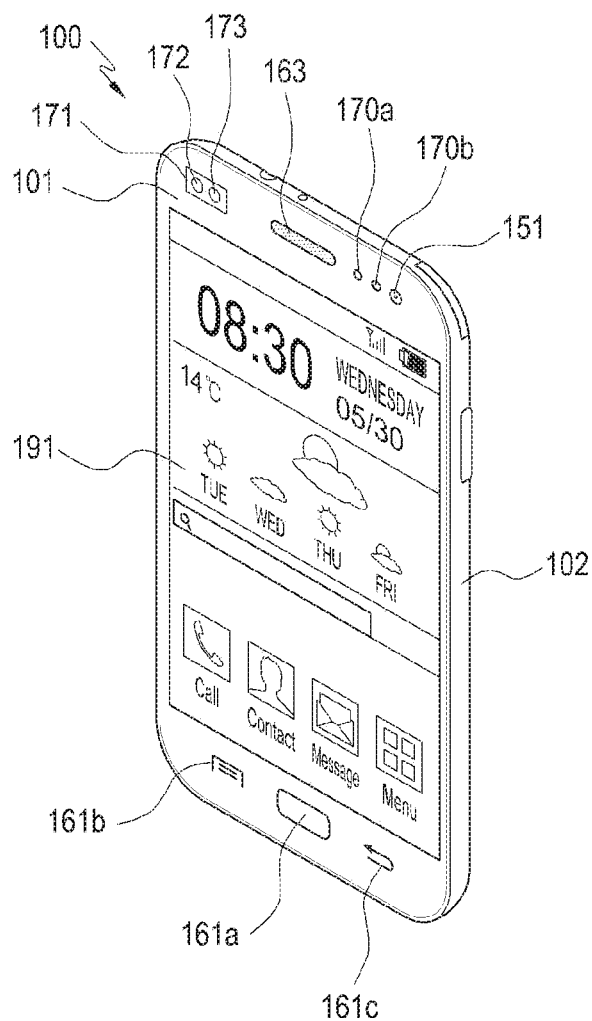
FIG. 2 is a front side perspective view of the first electronic device according to the first embodiment of the present invention.
Figure 3:
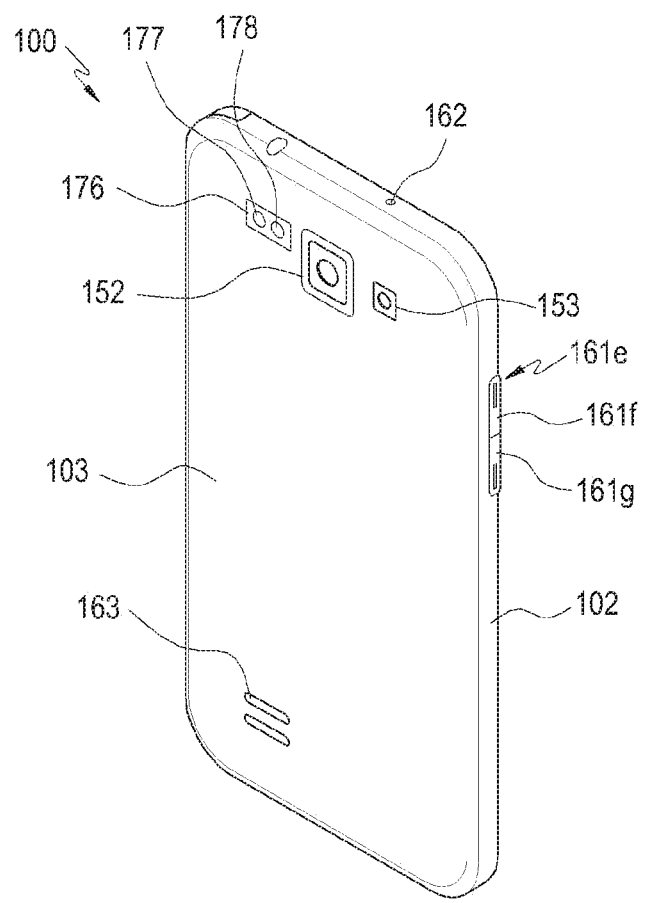
FIG. 3 is a rear side perspective view of the first electronic device according to the first embodiment of the present disclosure.

FIG. 1 is a block diagram illustrating a first electronic device according to the first embodiment of the present invention, FIG. 2 is a front side perspective view of the first electronic device according to the first embodiment of the present invention, and FIG. 3 is a back side perspective view of the first electronic device according to the first embodiment of the present invention.

Referring to FIG. 1, the first electronic device 100 may be connected to an external electronic device through a communication module 120, a connector, or the like. The external electronic device may include a Bluetooth communication unit, a Near Field Communication (NFC) unit, a WiFi Direct communication unit and a wireless Access Point (AP), which are wirelessly connectable. Further, the first electronic device 100 may be connected with another portable terminal or another electronic device, for example, one of a portable phone, a smart phone, a tablet Personal Computer (PC), a desktop PC, and a server in a wired or wireless manner.

Referring to FIG. 1, the first electronic device 100 includes at least one touch screen 190. Also, the first electronic device 100 includes a controller 110, a communication module 120, a camera module 150, an input/output module 160, a first sensor module 170, and a storage unit 175.

The controller 110 may include a CPU 111, a ROM 112 in which a control program for controlling the first electronic device 100 is stored, and a RAM 113 which stores signals or data input from outside of the first electronic device 100 or is used as a storage region for operations performed by the first electronic device 100. The CPU 111 may include a single core, a dual core, a triple core, or a quadruple core. The CPU 111, the ROM 112, and the RAM 113 may be connected to each other through an internal bus.

Also, the controller 110 controls the communication module 120, the camera module 150, the input/output module 160, the sensor module 170, the storage unit 175, and the touch screen 190.

The controller 110 detects a user input as either an input means or a touchable user input means such as a user's finger, which touches or approaches an object on the touch screen 190 or is located close to the object in a state where a plurality of objects or items are displayed on the touch screen 190. The controller 110 identifies an object corresponding to a position on the touch screen 190 where the user input is generated. The user input through the touch screen 190 includes one of a direct touch input that directly touches the object and a hovering input corresponding to an indirect touch input that approaches the object within a preset recognition range but does not directly touch the object. According to the present invention, a user input includes a gesture input through the camera module 150, a switch/button input through the button 161, a voice input through the microphone 162, or the like, in addition to the user input through the touch screen 190.

An object or item (or a function item) is displayed or may be displayed on the touch screen 190 of the first electronic device 100. For example, the object or item indicates at least one of an image, an application, a menu, a document, a widget, a picture, a video, an E-mail, a Short Message Service (SMS) message, and a Multimedia Message Service (MMS) message, and may be selected, executed, deleted, canceled, stored, or changed by a user input means. The term "item" has an inclusive meaning and includes a button, an icon (or a short-cut icon), a thumbnail image, and a folder storing at least one object in the portable terminal. Further, the item may be displayed in the form of an image, text and/or the like.

The short-cut icon is an image displayed on the touch screen 190 of the first electronic device 100 for use in a rapid execution of each application, or a voice call, an address, a menu, or the like which are basically provided in the first electronic device 100, and executes a corresponding application when a command or a selection for the execution of the short-cut icon is input.

When a user input event is generated with respect to a preset item or object, or based on a predetermined scheme, the first controller 110 executes a predetermined program operation corresponding to the user input event.

The first electronic device 100 includes at least one of a mobile communication module 121, a wireless LAN module 131, and a short range communication module 132 according to the performance thereof.

The mobile communication module 121 enables the first electronic device 100 to be connected with an external electronic device through mobile communication by using one antenna or a plurality of antennas under a control of the controller 110. The mobile communication module 121 transmits/receives, through a communication network provided by a communication company, a wireless signal for voice call, video call, an SMS, or an MMS to/from a portable phone, a smart phone, a tablet PC, or another device, having a phone number that may be input into the first electronic device 100.

The sub-communication module 130 includes at least one of the wireless LAN module 131 and the short distance communication module 132. For example, the sub-communication module 130 may include only the wireless LAN module 131 or only the short distance communication module 132. Alternatively, the sub-communication module 130 may also include both the wireless LAN module 131 and the short distance communication module 132. The sub-communication module 130 may also include a plurality of short-range communication modules.

The wireless LAN module 131 may be Internet-connected in a place where a wireless Access Point (AP) is installed according to a control of the controller 110. The wireless LAN module 131 supports a wireless LAN standard (IEEE802.11x) of the Institute of Electrical and Electronics Engineers (IEEE). The short range communication module 132 wirelessly performs short range communication between the first electronic device 100 and an external electronic device, under a control of the controller 110. The short-range communication scheme may include a Bluetooth communication scheme, an Infrared Data Association (IrDA) scheme, a WiFi Direct communication scheme, a Near Field Communication (NFC) scheme, or the like.

The camera module 150 includes at least one of the first camera 151 and the second camera 152 for photographing a still image or a video according to a control of the second controller 110. Also, the camera module 150 may further include a flash 153 that provides an auxiliary light source required for photographing a subject. The first camera 151 may be disposed on a front side of the first electronic device 100, and the second camera 152 may be disposed on a back side of the first electronic device 100.

Each of the first and second cameras 151 and 152 may include a lens system, an image sensor, and the like. Each of the first and second cameras 151 and 152 converts an optical signal input (or photographed) through the lens system to an electrical image signal (or a digital image) and outputs the converted electrical image signal to the controller 110. Then, the user photographs a video or a still image through the first and second cameras 151 and 152.

The input/output module 160 includes at least one button 161, at least one microphone 162, at least one speaker 163, and a connector.

The button 161 may be formed on the front side, a lateral side, or the back side of a housing (or a case) of the electronic device 100, and may include at least one of a power/lock button, a volume button, a menu button, a home button, a back button, and a search button.

The microphone 162 receives a voice or a sound, and generates an electrical signal according to a control of the controller 110.

The speaker 163 outputs sounds corresponding to various signals or data (for example, wireless data, broadcasting data, digital audio data, digital video data and the like) to the outside of the first electronic device 100, under a control of the controller 110. A connector may be used as an interface for connecting the first electronic device 100 with an external electronic device or an electric power source. The controller 110 may transmit data stored in the storage unit 175 of the first electronic device 100 to an external electronic device or may receive data from an external electronic device, through a cable connected to a connector by wire.

The sensor module 170 includes at least one sensor that detects a state of the first electronic device 100 or an ambient environment state. For example, the sensor module 170 may include at least one of a proximity sensor for detecting whether or not a user approaches the first electronic device 100, an illuminance sensor for detecting an amount of light surrounding the first electronic device 100, a motion sensor for detecting a movement of the first electronic device 100 (for example, a rotation, acceleration or vibration of the first electronic device 100), a gyroscope for detecting a rotational movement of the first electronic device 100, an accelerometer for detecting an acceleration movement of the first electronic device 100, a geo-magnetic sensor for detecting a point of a compass of the first electronic device 100 by using a magnetic field of the Earth, a gravity sensor for detecting the direction of gravity's pull, an altimeter for measuring atmospheric pressure so as to detect an altitude, a GPS module 157, and the like.

Also, the first sensor module 170 includes a first biometric sensor 171 and a second biometric sensor 176.

Referring to FIG. 2, the first biometric sensor 171 is disposed on the front side of the first electronic device 100, and the first biometric sensor 171 includes a first infrared ray light source 172 and a first infrared ray camera 173. The first infrared ray light source 172 outputs infrared rays, and the first infrared ray camera 173 detects infrared rays reflected from the subject. For example, the first infrared ray light source 172 may be formed of an LED array in a matrix structure.

For example, the first infrared ray camera may include a filter that passes an infrared light and blocks light in a wavelength band other than that of the infrared light, a lens system that focuses the infrared light having passed the filter, and an image sensor that converts an optical image formed by the lens system to an electric image signal. For example, the image sensor may be formed in a PD array of a matrix structure.

Referring to FIG. 3, the second biometric sensor 176 is disposed on the rear side of the first electronic device 100, and the second biometric sensor 176 has a configuration identical to the first biometric sensor 171 and includes a second infrared ray light source 177 and a second infrared ray camera 178.

The GPS module 157 receives electric waves from a plurality of GPS satellites in the Earth's orbit and calculates a position of the first electronic device 100 by using a time of arrival from the GPS satellites to the first electronic device 100.

Also, the storage unit 175 stores signals or data input/output according to operations of the communication module 120, the camera module 150, the input/output module 160, the sensor module 170, and the touch screen 190, based on a control of the controller 110. The storage unit 175 stores a control program and applications for a control of the first electronic device 100 or the controller 110.

Also, the storage unit 175 may store various applications such as a navigation, video calls, games, time-based alert applications, or the like; images to provide a Graphical User Interface (GUI) related to the applications; a database or data related to user information, documents and a visibility improvement method using gaze tracking; background images (such as a menu screen, an idle screen, or the like) or operating programs for operating the first electronic device 100; images taken by the camera module 150, and the like.

Also, the storage unit 175 stores a program and related data for implementing a visibility improvement method using gaze tracking according to the present invention.

The storage unit 175 is a machine (e.g., a computer)-readable medium, and the term "machine-readable medium" may be defined as a medium for providing data to the machine such that the machine may perform a specific function. The storage unit 175 may include a non-volatile medium and a volatile medium. All of these media should be tangible entities so that commands transferred by the media may be detected by a physical instrument through which the machine reads the commands.

The computer readable storage medium includes, but is not limited to, at least one of a floppy disk, a flexible disk, a hard disk, a magnetic tape, a Compact Disc Read-Only Memory (CD-ROM), an optical disk, a punch card, a paper tape, a RAM, a Programmable Read-Only Memory (PROM), an Erasable PROM (EPROM), and a Flash-EPROM.

Furthermore, the first electronic device 100 includes at least one touch screen 190 providing a user with user graphical interfaces corresponding to various services (for example, a phone call, data transmission, broadcasting, and photographing).

The touch screen 190 receives at least one user input through a user's body, for example, a finger, or an input unit, for example, a stylus pen, an electronic pen, and the like.

The touch screen 190 may receive successive motions in one touch (that is, a drag input). The term "touch" used in the present specification is not limited to a contact between the touch screen 190 and a finger or an input unit, and may include a non-contact (for example, a case where a user input means is located within a recognition distance (for example, 1 cm) where the user input means may be detected without a direct contact with the touch screen 190).

The touch screen 190 may be embodied as a resistive type, a capacitive type, an infrared type, an acoustic wave type, an ElectroMagnetic Resonance (EMR) type, or a combination thereof.

Referring to FIGS. 2 and 3, the touch screen 190 is disposed in the center of the front side 101 of the first electronic device 100. The touch screen 190 may have a large size to occupy most of the front side 101 of the first electronic device 100.

The touch keys such as the home button 161a, the menu button 161b, the back button 161c and the like, mechanical keys, or a combination thereof may be arranged at a lower portion of the touch screen 190. Further, the touch keys may be formed as a part of the touch screen 190.

The main home screen is displayed on the touch screen 190 through the home button 161a.

The menu button 161b provides a connection menu which may be displayed on the touch screen 190. The connection menu includes a widget addition menu, a background changing menu, a search menu, an editing menu, a configuration setup menu and the like.

The back button 161c may be used for displaying a screen that was executed immediately before a currently executed screen, or for terminating the most recently used application.

The first camera 151, an illuminance sensor 170a, a proximity sensor 170b, and the first biometric sensor 171 may be disposed on an upper portion of the front side 101 of the first electronic device 100. The second camera 152, the flash 153, the speaker 163, and the second biometric sensor 176 may be disposed on the back side 103 of the first electronic device 100.

The lateral side 102 of the first electronic device 100 may include, for example, a power/lock button, a volume button 161e including a volume up button 161f and a volume down button 161g, one or a plurality of microphones 162, and the like.

Also, a connector may be formed on a lower end of the lateral side of the first electronic device 100. A plurality of electrodes are formed on the connector, and may be connected by wire to an external device.

The present invention provides a visibility improvement method using gaze tracking, and the visibility improvement method using gaze tracking may be applied to an object on a general touch screen, a surrounding object viewed through a transparent touch screen, an augmented reality, a Head Mounted Display (HMD) device, and the like.

The controller 110 controls general operations of the first electronic device 100, and the controller 110 controls other component elements in the first electronic device 100 so as to execute a visibility improvement method using gaze tracking according to the present disclosure.

Figure 4:
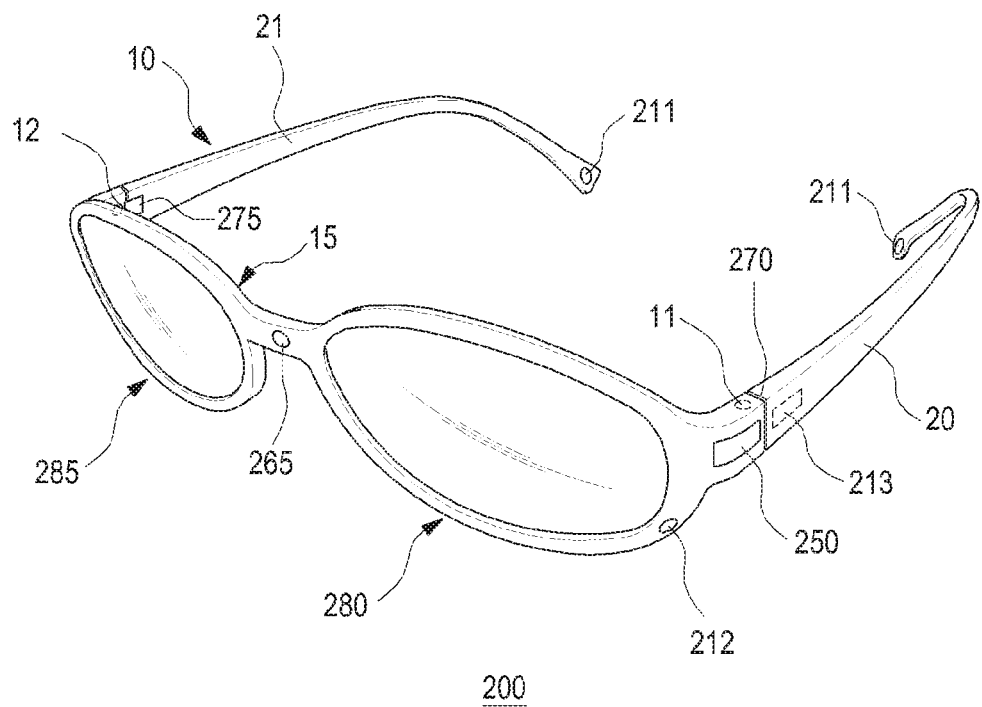
FIG. 4 is a perspective view of a second electronic device viewed from an external side according to a second embodiment of the present invention.
Figure 5:
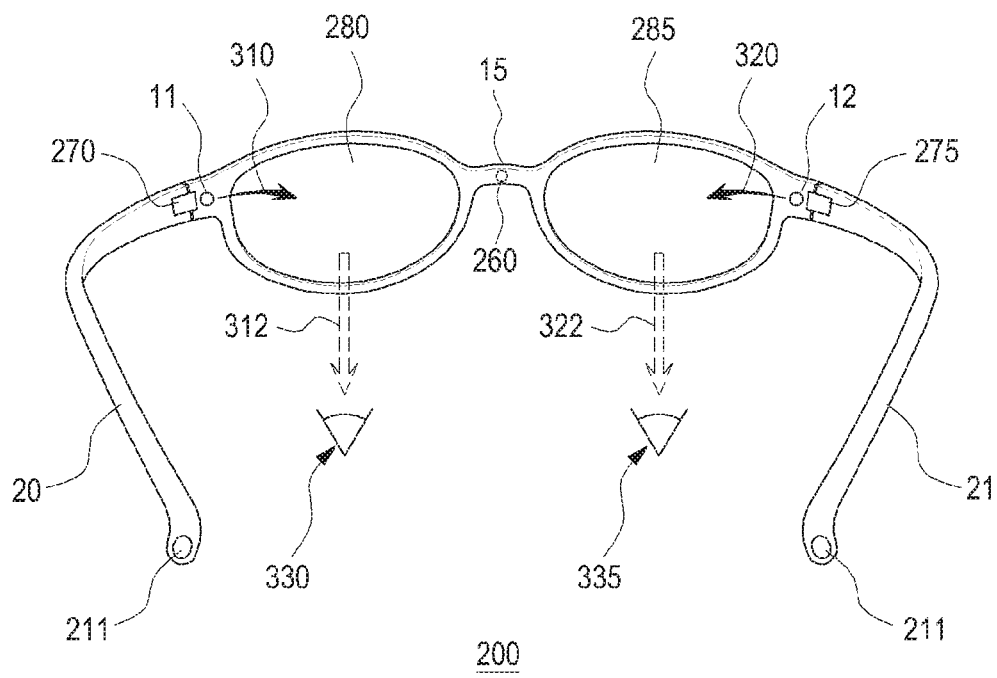
FIG. 5 is a perspective view of the second electronic device viewed from the internal side.

FIG. 4 is a perspective view of a second electronic device viewed from the external side according to a second embodiment of the present invention, and FIG. 5 is a perspective view of the second electronic device viewed from the internal side. The second electronic device 200 according to the second embodiment is a Head Mounted Display (HMD).

The second electronic device 200 is shaped like a pair of glasses, corresponds to a portable terminal (or a portable communication terminal), and includes a housing 10 and a circuit contained in the housing 10.

The housing 10 includes a front frame 15 in which first and second windows 280 and 285, respectively, corresponding to a left eye and a right eye are fixed, and first and second temple frames 20 and 21 that are folded to the inside or spread to the outside through first and second hinges. Hereinafter, a left eye and a right eye may be referred to as a first eye and a second eye, and the first and second windows 280 and 285 may referred to as first and second window panels, respectively.

A third camera 260 is disposed on the internal side of the front frame 15, a fourth camera 265 is disposed on the external side of the front frame 15. The third and fourth cameras 260 and 265 are disposed on a portion of the front frame 15 between the first and second window 280 and 285 (that is, a bridge of general glasses).

A microphone 212 is disposed on the external side of the front frame 15, and a touch sensor 250 is disposed on the external side of the front frame 15.

A first aperture 11 through which a first projected light 310 output from a first projector 270 disposed in the housing 10 is output to the outside of the front frame 15, is disposed on the internal side of the front frame 15. Also, a second aperture 12 through which a second projected light 320 output from a second projector 275 disposed in the housing 10 is output to the outside of the front frame 15, is disposed on the internal side of the front frame 15.

At least one button 213 is disposed on the external side of the first temple frame 20.

At least one speaker 211 is disposed on the internal side of the first and second temple frames 20 and 21.

The first projector 270 outputs the first projected light 310 for forming a first virtual image, the first projected light 310 output from the first projector 270 is focused and reflected by the first window 280, and the focused and reflected first projected light 312 forms the first virtual image on a retina of a left eye 330 of the user. In this example, the term "focus" refers to collecting light, and has a meaning including convergence that collects light at a point, reducing a beam spot of light, or the like. Desirably, the reflected first incident light 312 is collected in a crystalline lens or a pupil of the left eye 330.

The second projector 275 outputs the second projected light 320 for forming a second virtual image, the second projected light 320 output from the second projector 275 is focused and reflected by the second window 285, and the focused and reflected second projected light 322 forms the second virtual image on a retina of a right eye 335 of the user. Desirably, the reflected second incident light 322 is collected in a crystalline lens or a pupil of the right eye 335. Although the present example sets forth the case of two projectors, a single projector may be used.

In the following description, the first virtual image and the second virtual image are identical except for being displayed in the left eye and the right eye, respectively. However, the present invention is not limited thereto, and may display only one of the first virtual image and the second virtual image.

Figure 6:
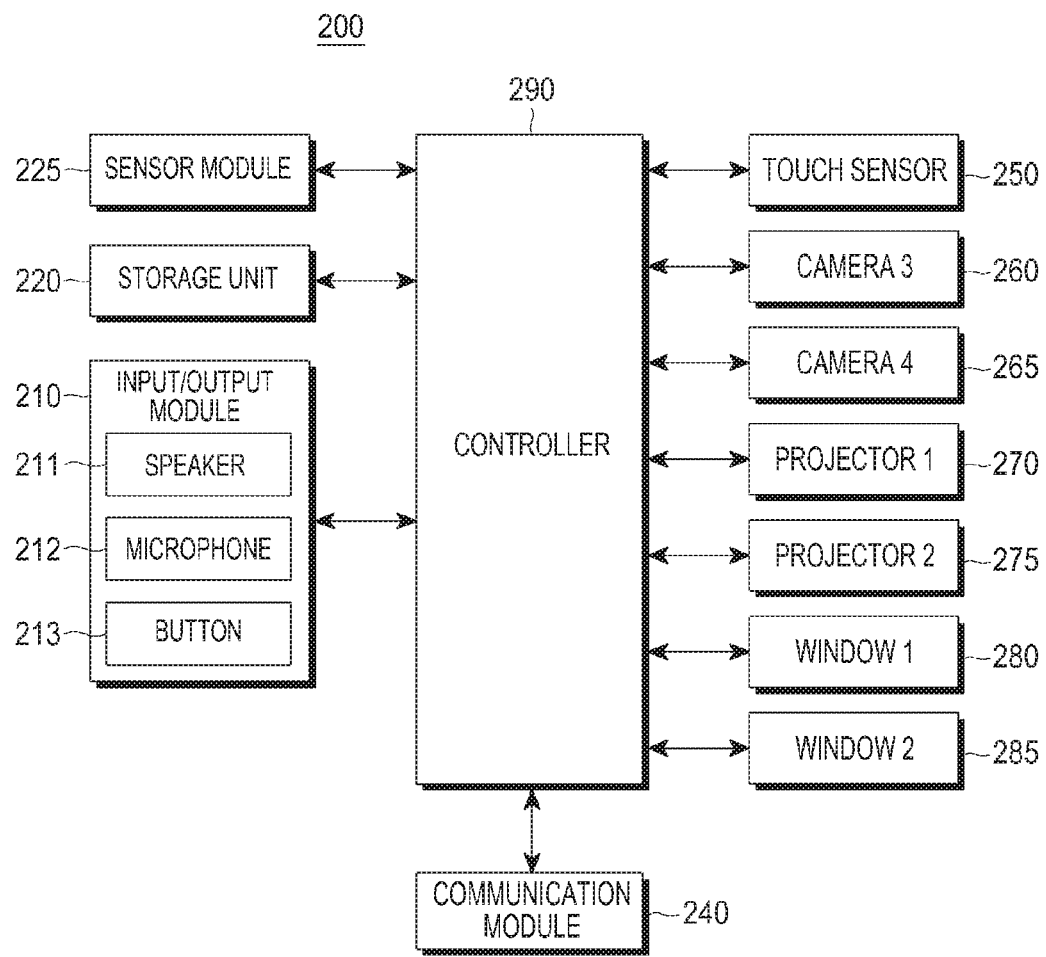
FIG. 6 is a block diagram of a circuit configuration of the second electronic device.

FIG. 6 is a diagram of a circuit configuration of the second electronic device. A circuit configuration of the second electronic device 200 is similar to the circuit configuration of the first electronic device 100 and thus, duplicate descriptions will be omitted.

The second electronic device 200 includes an input/output module 210, a storage unit 220, a sensor module 225, a communication module 240, the touch sensor 250, the third and fourth cameras 260 and 265, the first and second projectors 270 and 275, the first and second windows 280 and 285, and a controller 290.

The input/output module 210 includes at least one button 213, at least one microphone 212, at least one speaker 211, a connector, a keypad, or a combination thereof, as a means of receiving a user input, informing a user of information, receiving data from the outside, and/or outputting data to the outside.

The microphone 212 may be disposed on the external side of the front frame 15. In the present description, the terms "signals" and "data" may be interchangeable, and also the terms "data" and "data signals" may be interchangeable.

The button 213 is provided for receiving a user input, and is used for turning the second electronic device 200 on or off, selecting and/or searching for a menu item or an item, or the like. The button 213 may be disposed on the external side of the first temple frame 120.

The sensor module 225 includes at least one sensor that detects a state of the second electronic device 200 or an ambient environment state.

The communication module 240 may be a wired, wireless, or wired/wireless communication unit, wiredly or wirelessly transmits data from the controller 290 to an external electronic device through an external communication network or the air, or wiredly or wirelessly receives data from the external electronic device through an external communication network or the air and transfer the received data to the controller 290.

The touch sensor 250 transmits a signal corresponding to at least one touch input, to the controller 290. The controller 290 recognizes from the touch input information, user input information such as selection or movement of a menu item or an item, a handwritten input, or the like, and executes a function corresponding to the user input information (connection of a call, photographing with a camera, writing/viewing a message, transmitting data, or the like).

Each of the third and fourth cameras 260 and 265 may include a lens system and an image sensor, and may additionally include a flash, and the like. Each of the third and fourth cameras 260 and 265 converts light input (or photographed) through a corresponding lens system into an electronic image signal, and outputs the image signal to the controller 290. A user may photograph a still image or record a video through the cameras 260 and 265.

The controller 290 processes, based on a frame unit, an image input from the cameras 260 and 265, an image stored in the storage unit 220, or an image formed by the controller 290 using data stored in the storage unit 220, and outputs an image converted to be appropriate for screen output properties (a size, a definition, a resolution, or the like) of the first projector 270 and/or second projector 275 to the outside through the first projector 270 and/or the second projector 275.

The controller 290 provides images corresponding to various services (for example, phone call, data transmission, broadcasting, photographing, and the like) to the user through the first projector 270 and/or the second projector 275.

The user may view an image in which a surrounding landscape image obtained by an ambient light and a virtual image obtained by a light input from the projector 270 and 275 overlap, and the virtual image may be viewed by the user as if a transparent layer is layered on the surrounding landscape.

The controller 290 controls general operations of the second electronic device 200, and controls other component elements in the second electronic device 200 so as to execute a visibility improvement method using gaze.

The controller 290 displays, to a user through the first projector 270 and/or the second projector 275, image data stored in the storage unit 220, received through the communication module 240, or formed by the controller 290 based on data stored in the storage unit 220 according to a user command, selection of a menu item or an icon, or event information, input through the sensor module 225, the input/output module 210, the third camera 260 or fourth camera 265, or the touch sensor 250. In this example, the image may be a still image or a video.

The storage unit 220 stores signals or data according to a control of the controller 290. The storage unit 220 may store a control program and applications for a control of the second electronic device 200 or the controller 290.

Hereinafter, a visibility improvement method using gaze tracking will be described with reference to the first electronic device.

Figure 7:
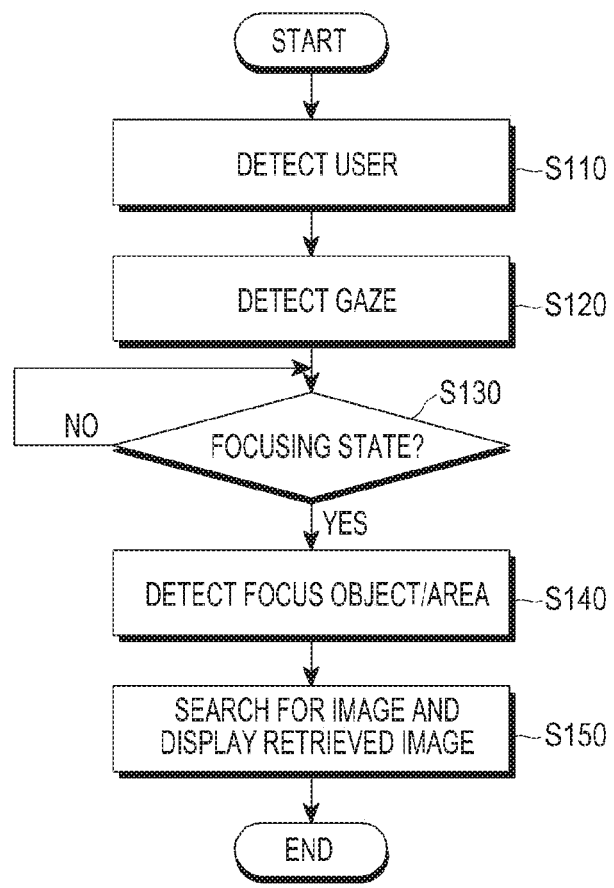
FIG. 7 is a flowchart illustrating a visibility improvement method using gaze tracking according to the first embodiment of the present invention.

FIG. 7 is a flowchart illustrating a visibility improvement method using gaze tracking according to the first embodiment of the present invention.

As a user detection step, the controller 110 detects a user through the first camera 151 or the first biometric sensor 171 in step S110. The controller 110 determines whether a subject included in the image photographed by the first camera 151 includes a face.

For example, the facial recognition is generally executed based on a facial recognition method, and a facial recognition technology using a facial contour line, a color and/or texture of facial skin, a template, and/or the like stored in the storage unit 175 may be used. For example, the controller 110 learns faces through facial images of a plurality of users, and may recognize a face from an input image based on the face learning. The face learning information is stored in the storage unit 175.

Also, the controller 110 may determine whether a user registered in advance with the first electronic device 100 is detected from the image input from the first camera 151. The registration of the user may be executed by storing information used for detecting the user in a database of the storage unit 175. The information used for detecting a registered user may include a facial image of the user, features points of the facial image of the user (or referred to as a feature image, a feature pattern, or the like), and/or the like. The feature point may be an edge, a corner, an image pattern, or a contour line.

For example, the controller 110 may determine whether a user in an input image is identical to a registered user by matching feature points of a registered user image and feature points detected from the input image.

The controller 110 determines whether a subject included in the image photographed by the first camera 171 includes a body part.

The body part may include an eye, an iris, a face, a blood vessel (e.g., a vein), and the like.

Figure 8A:
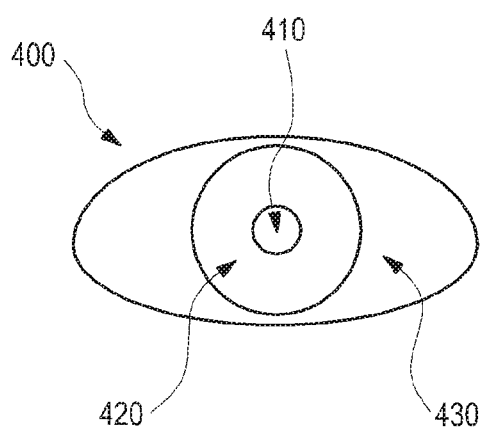
FIGS. 8A and 8B illustrate an eye of a user.
Figure 8B:
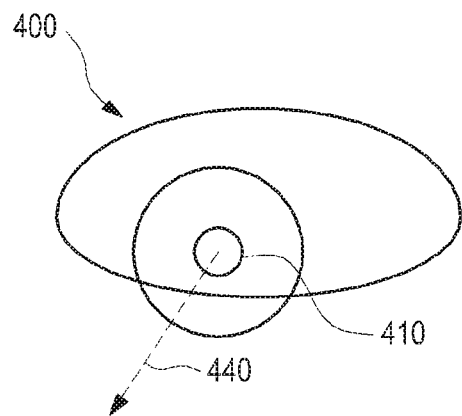

FIGS. 8A and 8B illustrate an eye of a user.

Referring to FIG. 8A, an eye 400 of a user includes a pupil 410, an iris 420, and a sclera 430. The first infrared ray light source 172 emits infrared rays into the eye 400 of the user, and the first infrared ray camera 173 photographs the eye 400 of the user so as to output an eye image.

For example, eye recognition is executed based on a general eye recognition method, and eye recognition technology based on an eye contour line, a template, and/or the like stored in the storage unit 175 may be used. For example, the controller 110 learns eyes through eye images of a plurality of users, and may recognize an eye from an input image based on the eye learning. The eye learning information is stored in the storage unit 175.

Also, the controller 110 compares iris information of a user stored in the storage unit 175 (e.g., an iris image, feature point information, and/or the like) and an input image, so as to recognize an iris of the user, and to determine whether the user in the input image is identical to a registered user.

As described above, the controller 290 may also detect a user through the third camera 260.

As a gaze detection step, the controller 110 detects a gaze of the user from the input image in step S120. The controller 100 may detect the gaze of the user from the input image based on general eye tracking technology.

Referring to FIG. 8B, the controller 100 detects a gaze (a direction of a gaze) of the user from a pose (a position and/or a direction) of the pupil 410.

As a focusing state determination step, the controller 110 determines whether the user focuses on (steadily gazes at) an object in step S130. For example, the controller 110 may determine whether the user focuses on an object based on a facial expression in an input image, a gazing time, or a change in the pupil 410.

Figure 9A:
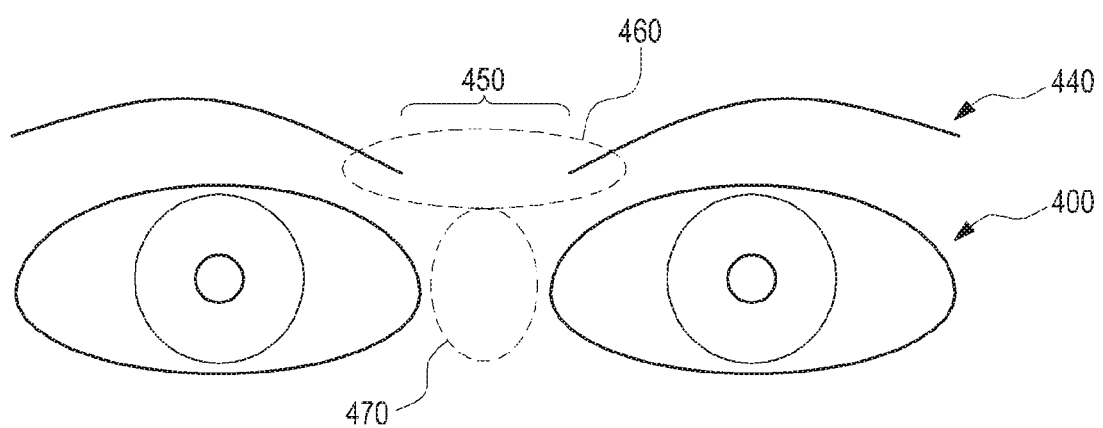
FIGS. 9A and 9B illustrate a method of determining whether a user focuses on an object based on a facial expression.
Figure 9B:
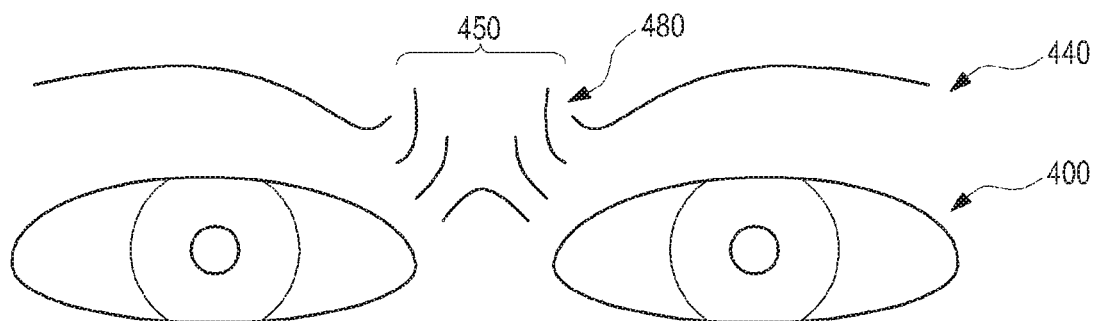

FIGS. 9A and 9B illustrate a method of determining whether the user focuses on an object based on a facial expression.

FIG. 9A illustrates a facial expression when a user does not focus on an object, and displays two eyes 400, two eyebrows 440, corrugator muscles 460 (corrugator supercilii muscles) between the two eyebrows 440 in a glabella portion 450, and procerus muscle 470 between the two eyes 400 in the glabella portion 450.

FIG. 9B illustrates a facial expression when a user focuses on an object. When a user focuses on an object, the user generally frowns and whether the user focuses on an object may be determined based on a change in muscles of the glabella portion 450. For example, when a user focuses on an object, corrugator muscles move and thus, the distance between the two eyebrows 440 becomes narrow. Accordingly, wrinkles 480 appear in the glabella portion 450 and the nose is drawn upward due to a movement of procerus muscle 470, and thus wrinkles 480 appears on the bridge of the nose.

Also, the controller 110 determines whether the user focuses on an object based on the gazing time, and when a gaze of a user is detected, sets a timer including a predetermined time limit (that is, a threshold time). For example, the time limit of the timer may be 1 second. The timer counts down from 1 to 0 seconds and notifies the controller 110 of the expiration of the timer when a remaining time of the timer is 0 seconds, or the controller 110 may sense the expiration of the timer. Alternatively, the timer may count time from 0 seconds and notifies the controller unit 110 of the expiration of the timer when the elapsed time is 1 second, or the controller 110 senses the expiration of the timer. When the gaze does not change during the time limit of the timer, the controller 110 determines that the user focuses on an object.

Alternatively, the controller 110 determines whether the user focuses on an object based on a change in the pupil 410 of the user. That is, whether the user focuses on an object is determined based on the phenomenon in which the pupil 410 is enlarged while the user focuses on an object.

The controller 110 executes step S140 when the user focuses on an object, and periodically or continuously monitors whether the user focuses on an object while the user is not focusing on any object.

As a focus object/area detection step, the controller 110 determines an area where a gaze of the user intersects an image surface (that is, a focus area), and detects an object placed in the focus area in step S140.

Figure 10:
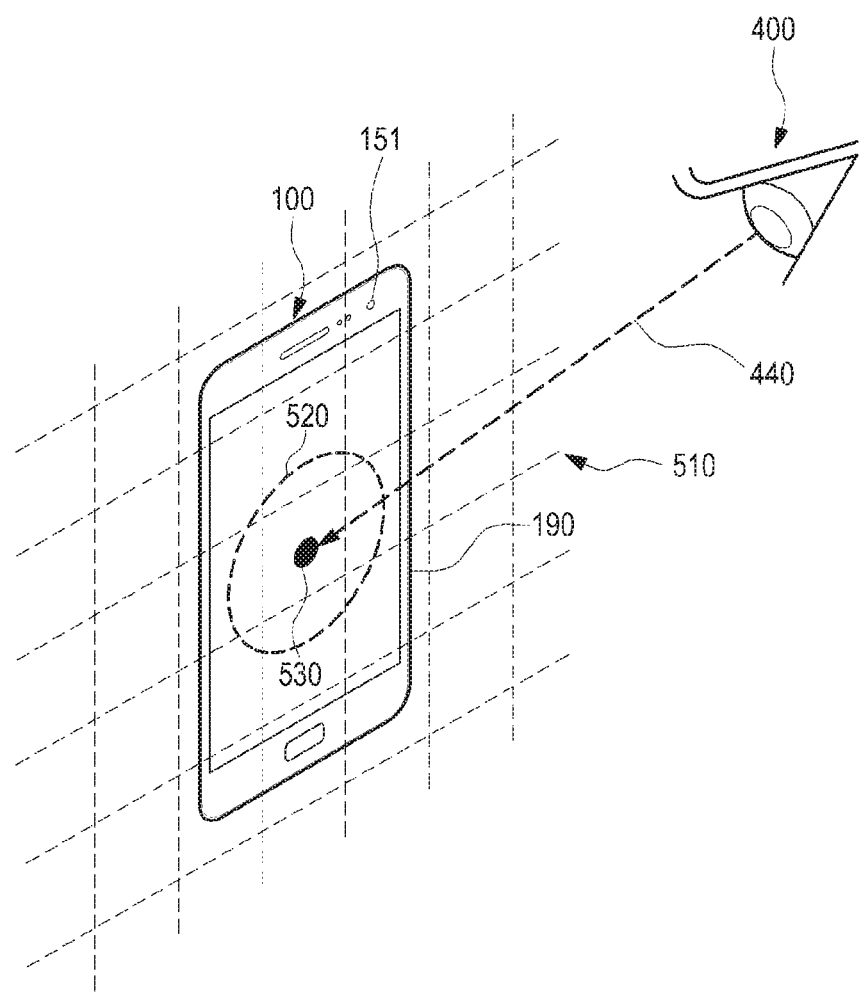
FIG. 10 is a diagram illustrating a method of detecting a focus object according to the first embodiment of the present invention.

FIG. 10 is a diagram illustrating a method of detecting a focus object according to the first embodiment of the present invention. The present embodiment describes the case in which the touch screen 190 is a non-transparent touch screen.

An image surface 510 is a screen or a surface of the touch screen 190, and an area in which the gaze 440 of the user's eye 400 intersects the image surface 510 is a focus area 520. The controller 110 determines an object 530 in the focus area 520.

Figure 11:
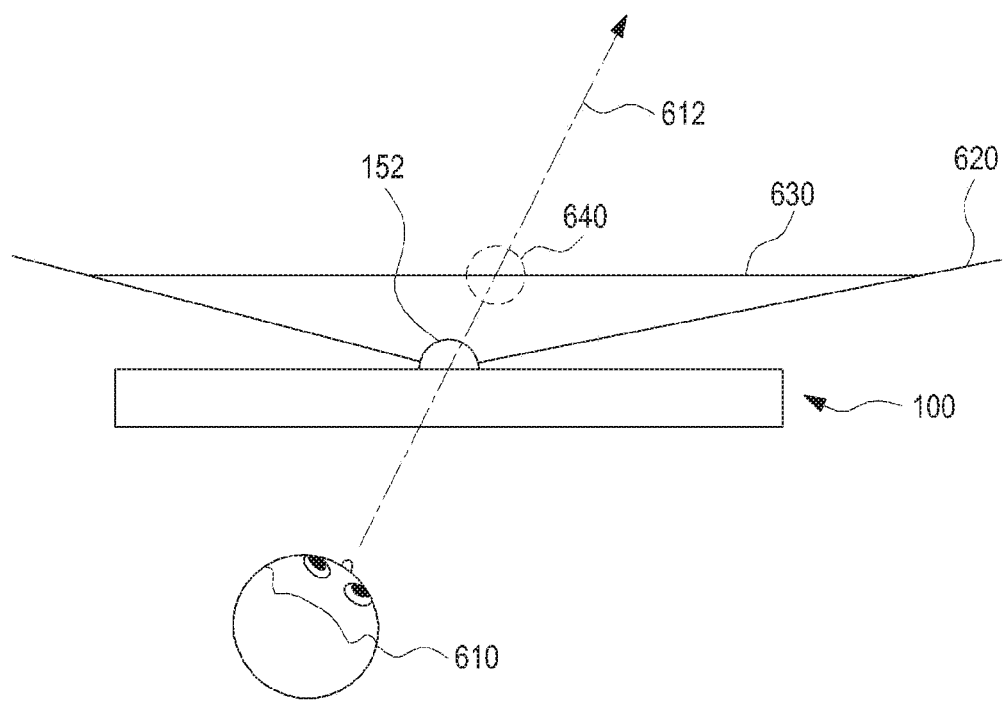
FIG. 11 is a diagram illustrating a method of detecting a focus object according to the second embodiment of the present invention.

FIG. 11 is a diagram illustrating a method of detecting a focus object according to the second embodiment of the present invention. The present embodiment describes the case in which the touch screen 190 is a non-transparent touch screen.

A surrounding landscape limited by an angle of view 620 of the second camera 152, that is, an image of a surrounding landscape photographed by the second camera 152, is an image surface 630, and an area in which a gaze 612 of a user's eye 610 intersects the image surface 630 is a focus area 640.

Figure 12:
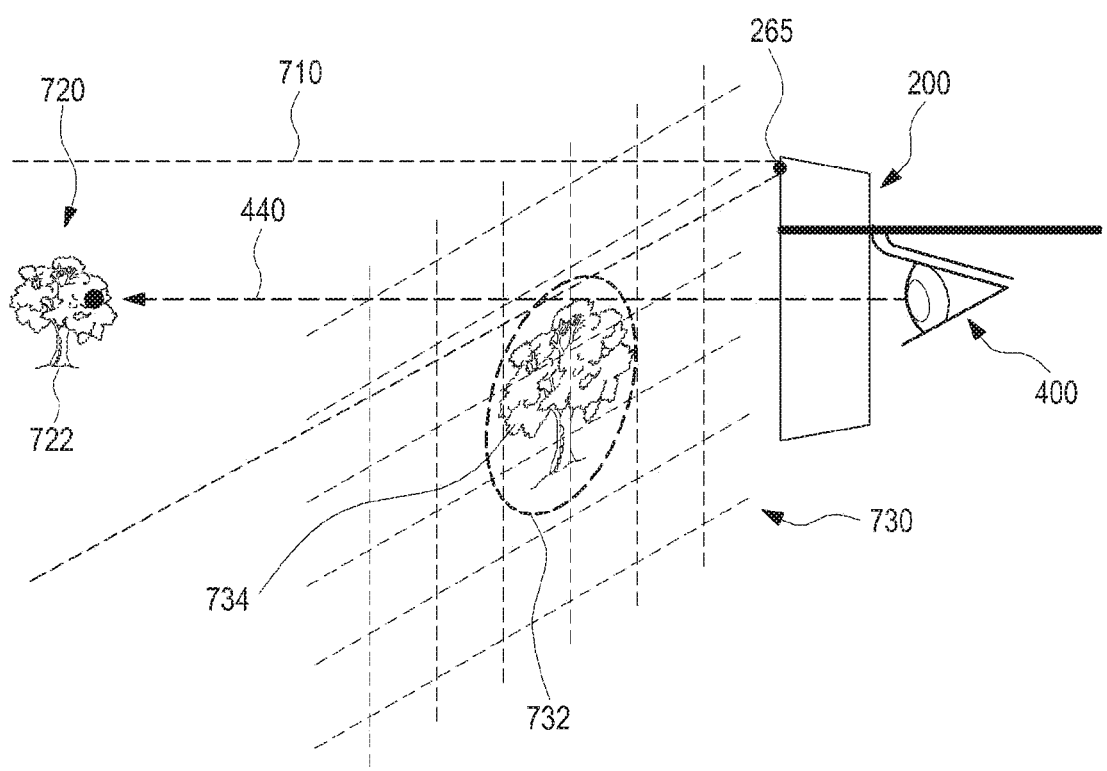
FIG. 12 is a diagram illustrating a method of detecting a focus object according to a third embodiment of the present invention.

FIG. 12 is a diagram illustrating a method of detecting a focus object according to a third embodiment of the present invention. The present embodiment describes the case in which the second electronic device 200 detects a focus object. The focus object includes a person, an animal, a plant, an object, a building, a mountain, or the like included in a surrounding landscape.

A surrounding landscape 720 limited by an angle of view of a fourth camera 265, that is, an image of a surrounding landscape area 720 photographed by the fourth camera 265, is an image surface 730, and an area in which a gaze 440 of a user's eye 400 intersects the image surface 730 is a focus area 732. The controller 290 determines that a tree image 734 included in the focus area 732 which corresponds to a tree 722 in a surrounding landscape 720 is the focus object. That is, an area or an object in an extended line of a gaze of the user in the transparent window 280 and 285 may be a focus area or a focus object. In other words, an area or an object in the extended line of a gaze of the user in a transparent display such as a transparent touch screen 190, a transparent window 280 and 285, or the like, may be the focus area or the focus object.

Referring back to FIG. 7, as an image search and display step, the controller 110 searches for an image with high visibility corresponding to a focus object, and displays the retrieved image in step S150.

The image with high visibility includes a high-resolution (or high-definition) image, an image with enhanced visibility, a vector graphics image, an image in a short-distance, an image photographed when a great amount of light is provided (that is, an image photographed in a state in which an ambient illuminance is high), or the like. The image with high visibility has a higher resolution, definition, or brightness than the focus object, based on an identical size.

The controller 110 may search the storage unit 175 for an image with high visibility corresponding to a focus object having low visibility and, for example, the controller 110 determines an image with high visibility stored in the storage unit 175 through an image matching process.

Alternatively, the controller 110 may search an external server for an image with high visibility. For example, the controller 110 transmits, to a server, an image including a focus object having low visibility (or the image and location information of the focus object) and/or information associated with the focus object, and receives an image with high visibility retrieved from the server. The information associated with the focus object may include location information of the first electronic device 100 at the time of photographing the focus object, pose (compass direction or direction) information of the first electronic device 100, image source information (image-related program, a web address from which an image is downloaded, or the like), and/or the like.

Figures 13A, 13B, 13C:
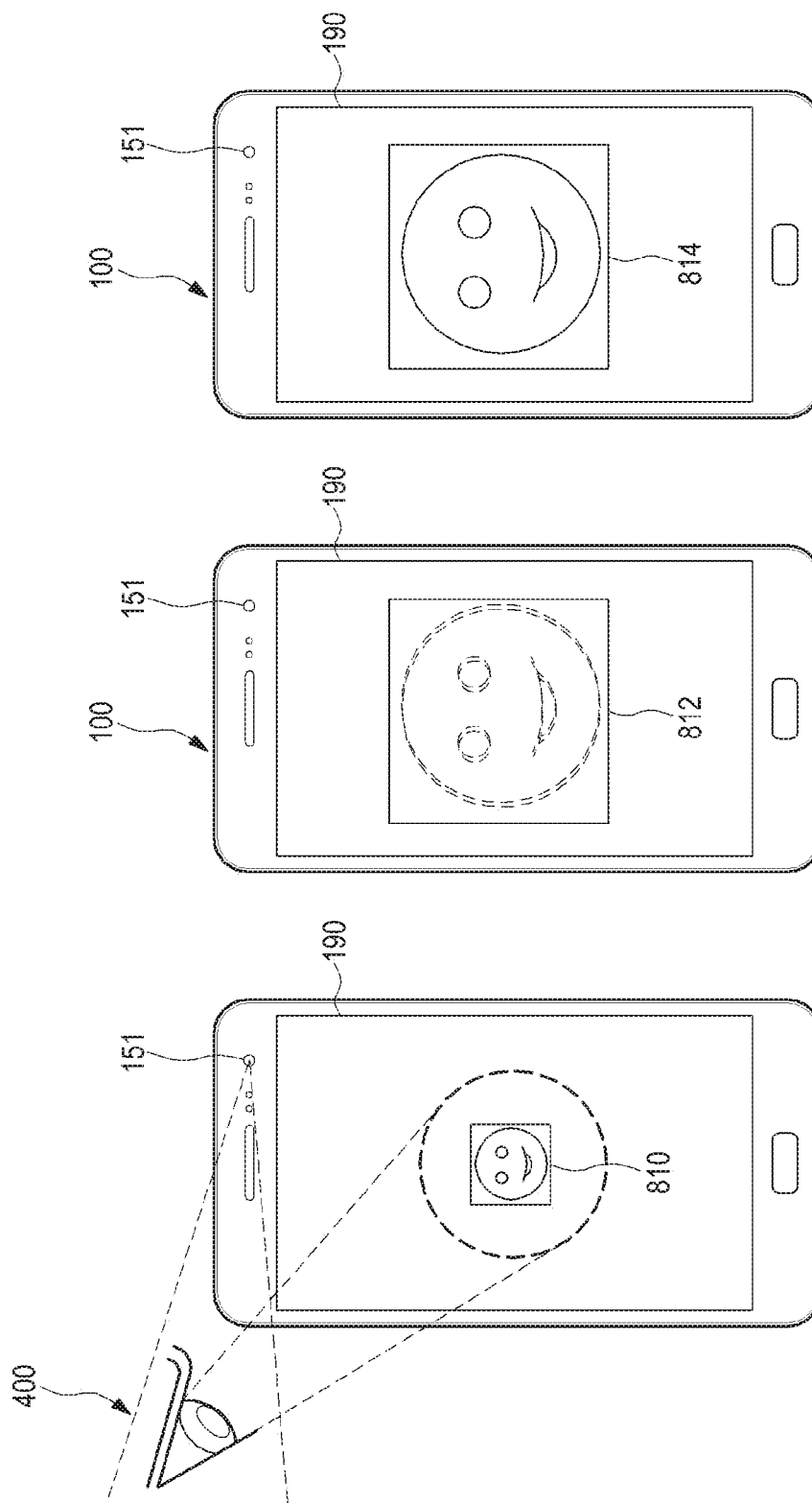
FIGS. 13A-13C illustrate a method of displaying a high-visibility image according to the first embodiment of the present invention.

FIGS. 13A-13C illustrate a method of displaying an image with high visibility according to the first embodiment of the present invention.

Referring to FIG. 13A, the eye 400 of the user focuses on a thumbnail image 810 displayed on the touch screen 190 of the first electronic device 100, and is captured by first camera 151.

FIG. 13B is a comparison example of the present invention, and illustrates an enlarged image 812 of a thumbnail image having low resolution.

Referring to FIG. 13C, the controller 110 determines related information of the thumbnail image 810 (that is, location information of an original image), and displays an enlarged original image 814 on the touch screen 190.

As shown in FIG. 13B, when the thumbnail image having low resolution is enlarged, the unclear image 812 having low definition is displayed. Conversely, as shown in FIG. 13C, when an original image associated with a thumbnail image is used, the clear image 814 having high definition is displayed.

Figure 14C:
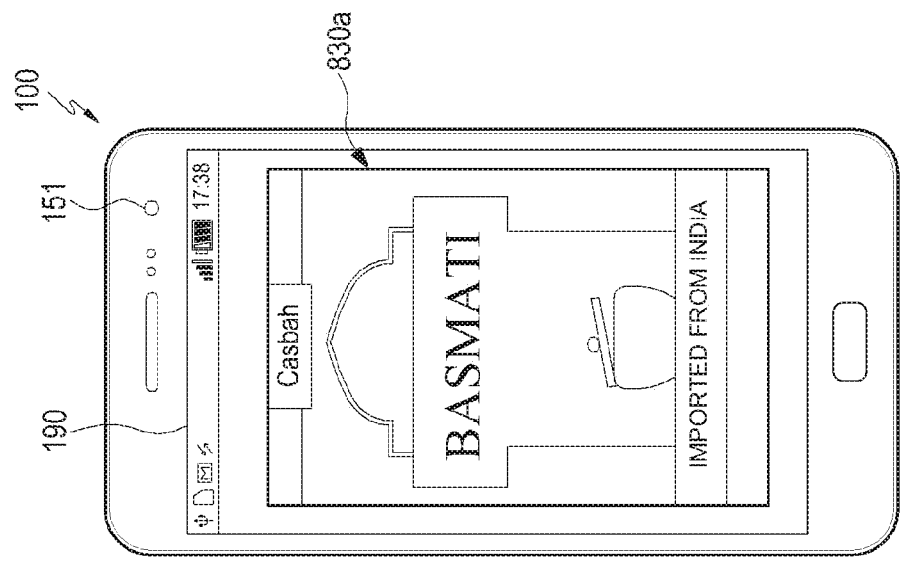
FIGS. 14A-14C illustrate a method of displaying a high-visibility image according to the second embodiment of the present invention.
Figure 14B:
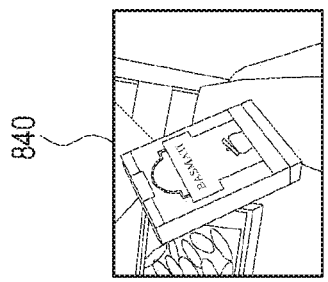
Figure 14A:
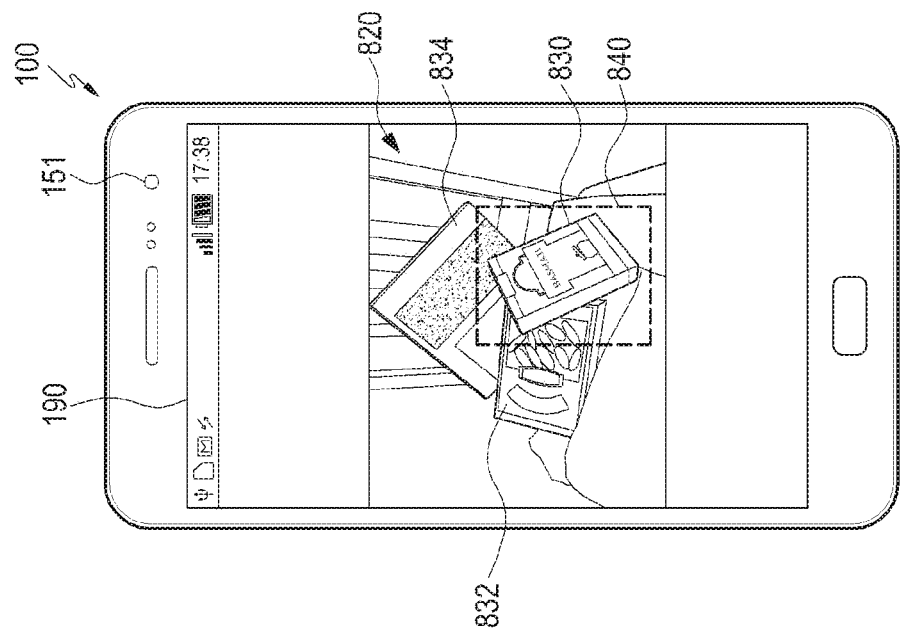

FIGS. 14A-14C illustrate a method of displaying an image with high visibility according to the second embodiment of the present invention.

Referring to FIG. 14A, an image 820 obtained by photographing first through third boxes 830, 832, and 834 placed on a table is displayed on the touch screen 190 of the first electronic device 100. The controller 110 determines a focus area 840 including the first box 830 based on a gaze of a user.

Referring to FIG. 14B, the first controller 110 transmits the focus area image 840 to a server.

Referring to FIG. 14C, the first controller 110 receives, from a server, an image with high visibility 830 associated with the first box included in the focus area, and displays the image with high visibility 830a on the touch screen 190.

Figure 15A:
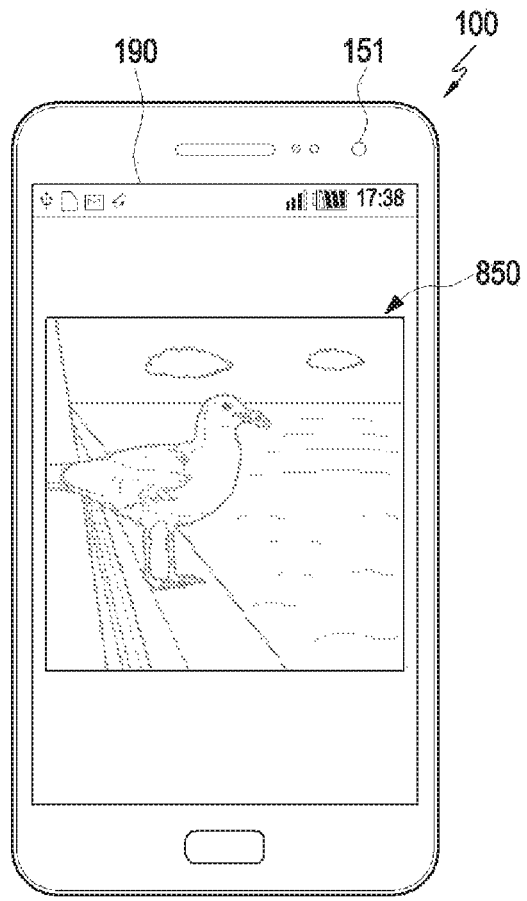
FIGS. 15A and 15B illustrate a method of displaying a high-visibility image according to the third embodiment of the present invention.
Figure 15B:
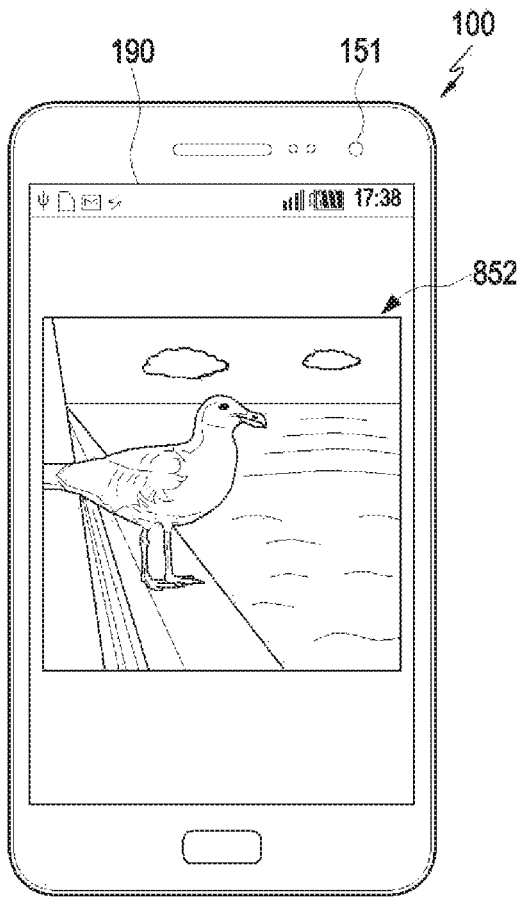

FIGS. 15A and 15B illustrate a method of displaying an image with high visibility according to the third embodiment of the present invention.

Referring to FIG. 15A, an image 850 obtained by photographing a bird, having low visibility, is displayed on the touch screen 190 of the first electronic device 100. The controller 110 determines the image 850 having low visibility as a focus object, based on the gaze of a user.

Referring to FIG. 15B, when an image with high visibility corresponding to a focus object is not retrieved, the controller 110 generates an image having high definition through image filtering or applying a visual effect, and displays the generated the high-definition image 852 on the touch screen 190.

Also, a parameter of the camera used for photography is adjustable. For example, when an amount of light around the bird is excessive or insufficient, an object focused on is not captured well due to a camera aperture or a white balance value. In this example, to display an image with high visibility, the object focused on is checked and the parameter of the camera is adjusted based on the object.

Figure 16C:
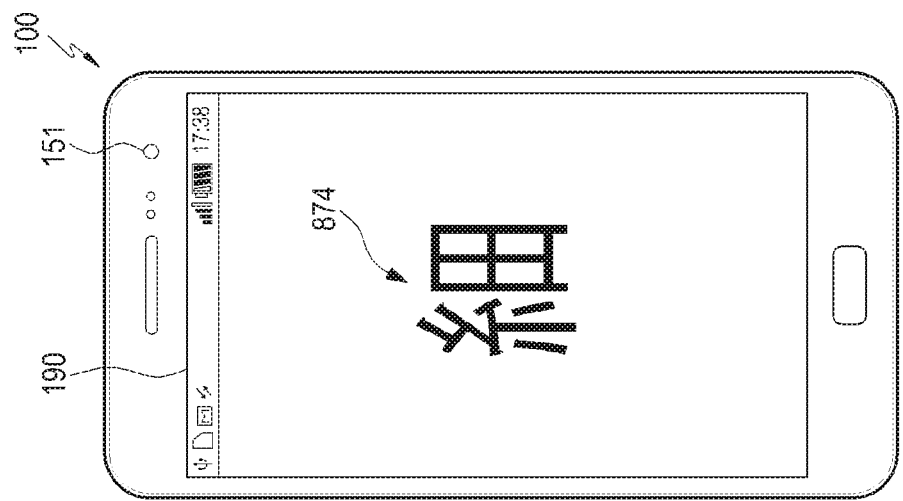
FIGS. 16A-16C illustrate a method of displaying a high-visibility image according to a fourth embodiment of the present invention.
Figure 16B:
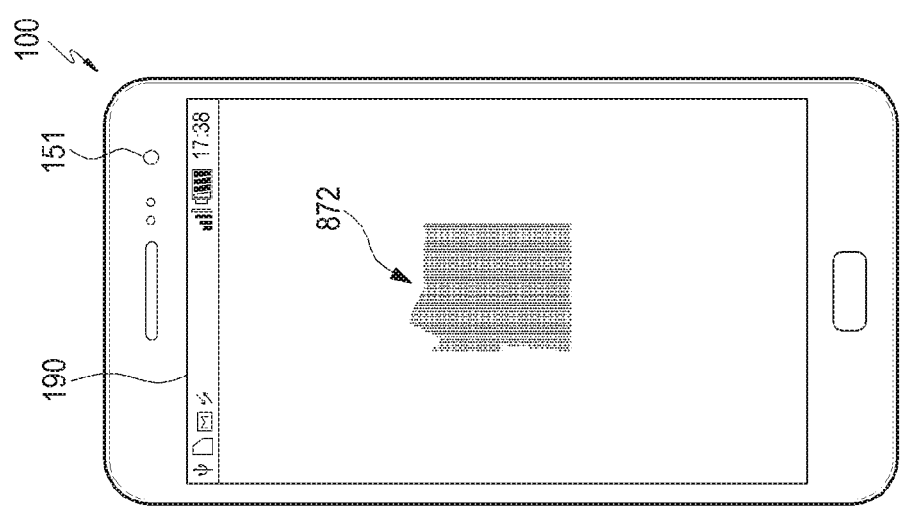
Figure 16A:
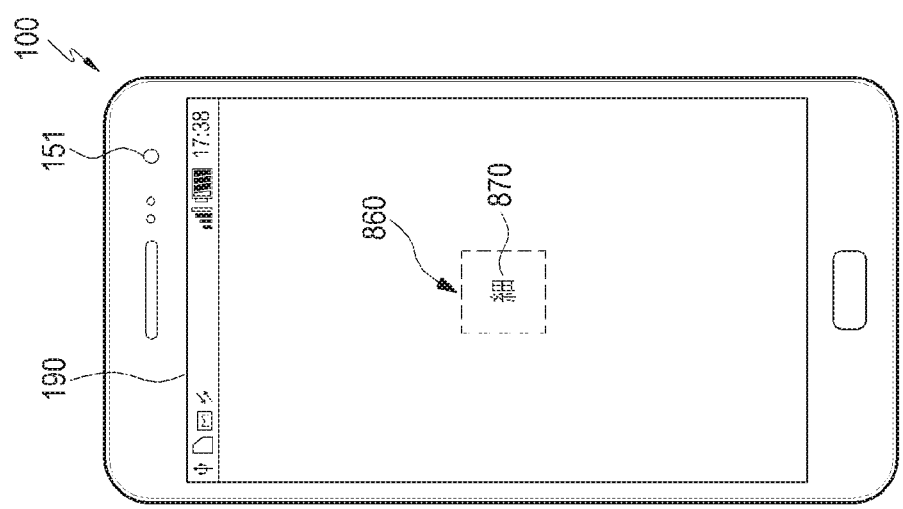

FIGS. 16A-16C illustrate a method of displaying an image with high visibility according to a fourth embodiment of the present invention.

Referring to FIG. 16A, a user focuses on a character 870 displayed on the touch screen 190 of the first electronic device 100, and the controller 110 determines a focus area 860 based on a gaze of the user, and determines the character 870 having low visibility due to its size, to be a focus object.

FIG. 16B is a comparison example of the present invention, and illustrates that an image 872 which is difficult to identify is generated when a raster graphics image or a bitmap image representing a small character is enlarged.

Referring to FIG. 16C, the controller 110 generally recognizes a character which is a focus object in a bitmap image through a character recognition method, searches the storage unit 175 for a vector image corresponding to the focus object, and enlarges the retrieved vector image 874 for display. Also, when the character which is the focus object is a vector image, the character may be displayed by increasing the size of the character.

Figure 17:
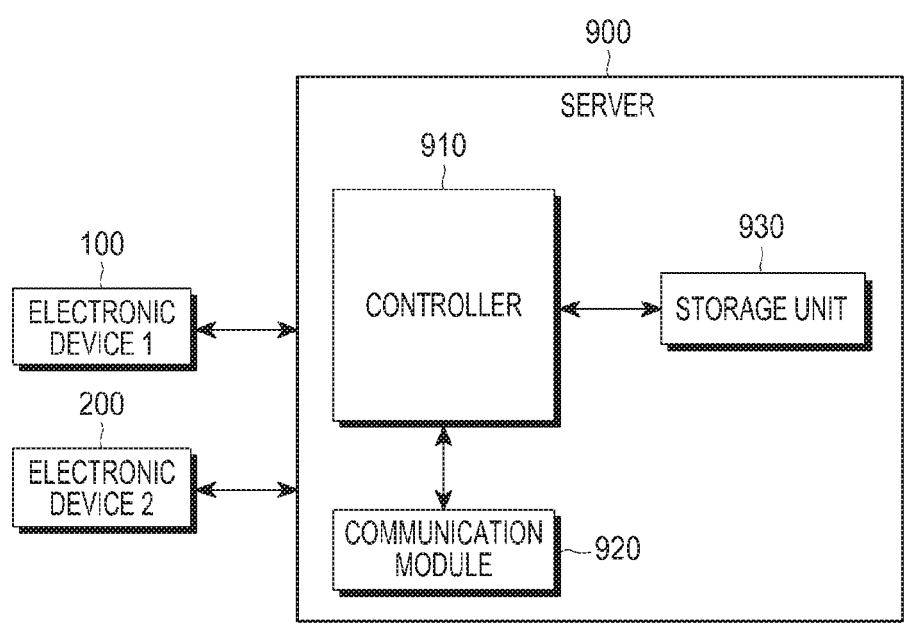
FIG. 17 is a block diagram illustrating a configuration of a server.

FIG. 17 is a block diagram illustrating a configuration of a server.

A server 900 includes a communication module 920, a storage unit 930, and a controller 910.

The communication module 920 executes wired or wireless communication with the first electronic device 100 or the second electronic device 200.

The storage unit 930 includes a program including instructions that instruct the first electronic device 100 or the second electronic device 200 to execute a method of displaying an image with high visibility, update information of the program, an image database, a street panorama database, a two-dimensional (2D) map, and/or the like.

The street panorama database includes street view images mapped to a plurality of different locations. The street panorama database is a map database, and stores an actual three-dimensional (3D) map formed of actual images obtained by photographing cities or streets through a camera. Here, the actual 3D map refers to a 3D map embodied by photographing an actual street using a vehicle, an airplane, or the like and using the photographed actual image. Such an actual 3D map is obtained by photographing a city or a street using a stereo camera mounted on a vehicle or the like. Therefore, it may obtain not only three dimension coordinates (x, y and z coordinates) of objects included in the photographed image, but also depth information corresponding to the distance between the camera used in the photographing and the objects. In addition, such a 3D map may be implemented by photographing a plurality of 2D images for a wide area using an airplane, extracting depth information in an overlapping area between two neighboring 2D images among the photographed images, and performing 3D modeling through 3D mapping.

In addition, each of the objects included in the actual 3D map has a plurality of pieces of 3D information and depth information items. For example, each of a plurality of pixels expressing each object may have 3D information and depth information. As a result, the actual 3D map may differentiate not only a position of a specific building but also the contour of the building, for example, the front, rear and side views of the specific building, and may also differentiate respective floors of the building. On the contrary, an existing 2D map is different from the above-described 3D in that since only GPS information is used from the 2D map, only a single location information item may be provided for a specific building but the front and rear sides or respective floors of the building may not be differentiated in detail.

The controller 910 transmits a program or update information to the first electronic device 100 or the second electronic device 200 automatically, or in response to a request from the first electronic device 100 or the second electronic device 200.

Also, the controller 910 matches a focus object image (and/or related information) received from the first electronic device 100 or the second electronic device 200 and an image stored in the image database or the street panorama database, and transmits a matched image with high visibility to the first electronic device 100 or the second electronic device 200. The controller 910 improves the matching speed and accuracy based on the information associated with the focus object received from the first electronic device 100 or the second electronic device 200. Each database may store an image, and also store location information corresponding to the image, including a location, a pose (a compass direction), or the like, image source information (such as an image-related program, and a web-address from which an image is downloaded), and/or the like.

While the above embodiments have been described using the first electronic device 100 as an example, the embodiments of the present invention may be applied to the first electronic device 100 or the second electronic device 200, in the same or similar manner. Hereinafter, other examples of a method of displaying an image with high visibility using the second electronic device 200 will be provided.

FIGS. 18A, 18B, 19A and 19B illustrate a method of displaying an image with high visibility according to a fifth embodiment of the present invention.

When one of a plurality of focus objects exists in a direction of a gaze of a user, the controller 290 may virtually move a viewpoint of the user based on a command of the user. The movement of the viewpoint corresponds to enlarging a focus object for display in the described examples, or may correspond to reducing the focus object.

Figure 18A:
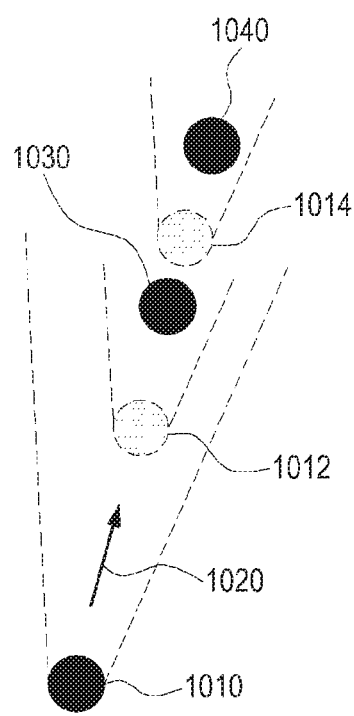
FIGS. 18A-18B and 19A-19B illustrate a method of displaying a high-visibility image according to a fifth embodiment of the present invention.

Referring to FIG. 18A, when a first focus object 1030 and a second focus object 1040 exist in a direction 1020 of a gaze of a user's eye 1010, although the controller 290 displays an image with high visibility associated with the first focus object 1030 that is closest to the user, the controller 290 may move a virtual viewpoint back and forth along the direction of the gaze based on a command of the user.

Figure 18B:
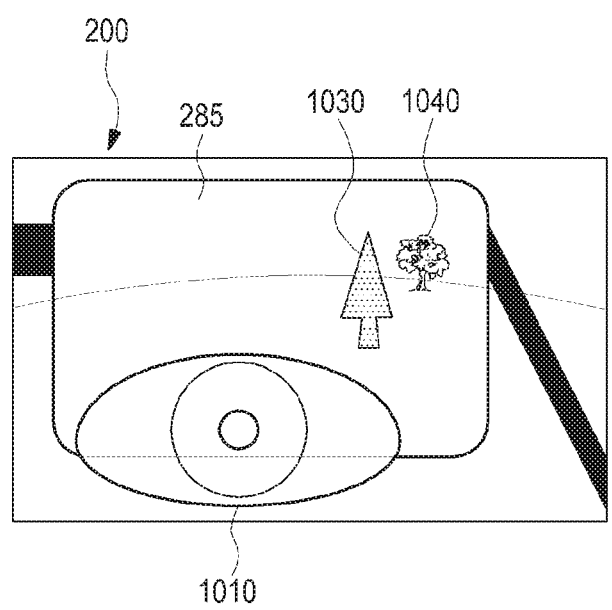

FIG. 18B illustrates that the user views the first focus object 1030 and the second focus object 1040 through the second window 285 of the second electronic device 200.

Figure 19A:
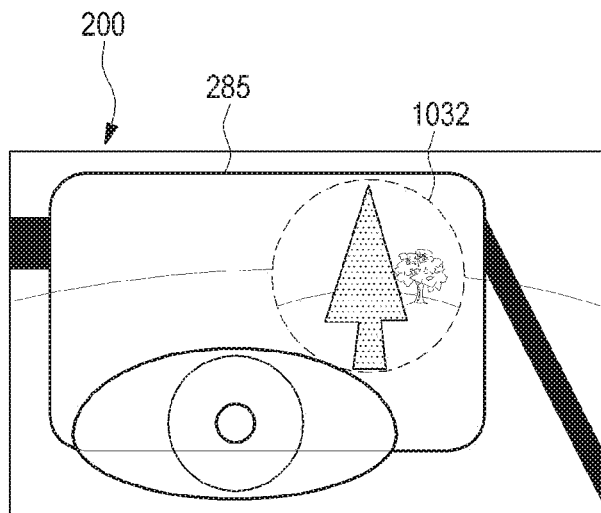

Referring to FIGS. 18A and 19A, an enlarged first focus object 1032 (that is, an image with high visibility) at a first virtual viewpoint 1012 between the user and the first focus object 1030 is displayed through the second window 285. In this manner, the enlarged first focus object 1032 is displayed through the second window 285.

Figure 19B:
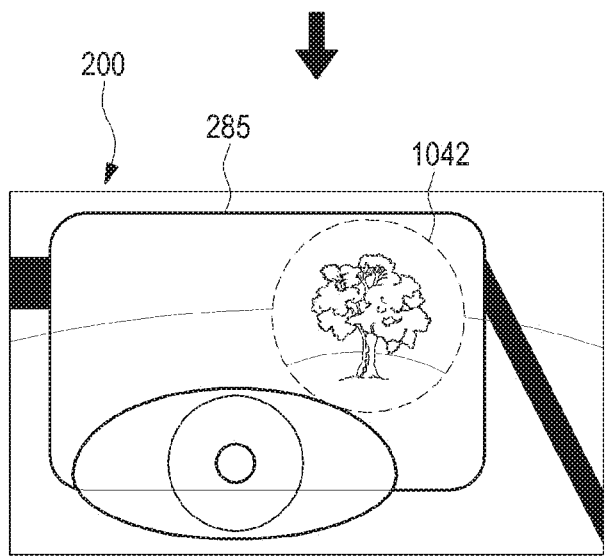

Referring to FIGS. 18A and 19B, an enlarged second focus object 1042 (that is, an image with high visibility) at a second virtual viewpoint 1014 between the first focus object 1030 and the second focus object 1040 is displayed on the second window 285.

The controller 290 transmits an image of a focus object and related information (e.g., location information of the second electronic device 200, pose (or compass direction or direction) information of the second electronic device 200, and/or the like) to the server 900, and receives and displays an image with high visibility of a focus object received from the server 900. The virtual viewpoint may be switched by a command of the user (a voice, a gesture, or a touch). Also, a provided image may be switched by a change in a facial expression of the user (providing an image of a distant object when focus is maintained).

Figure 24A:
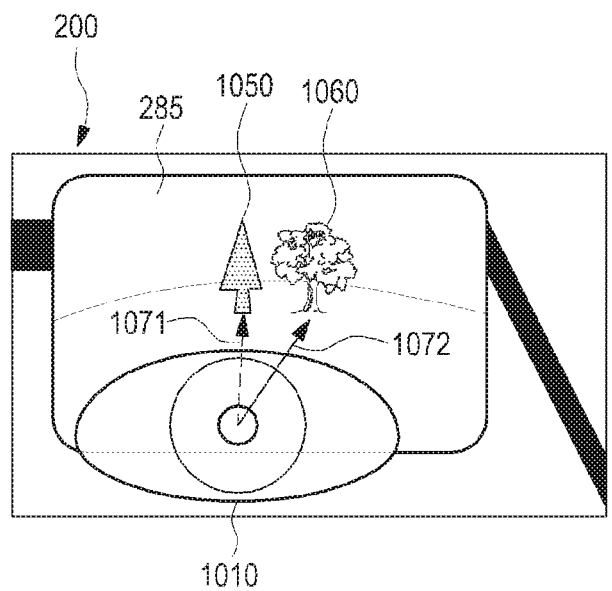
FIGS. 24A-24C illustrate a change of a focus object.
Figure 24B:
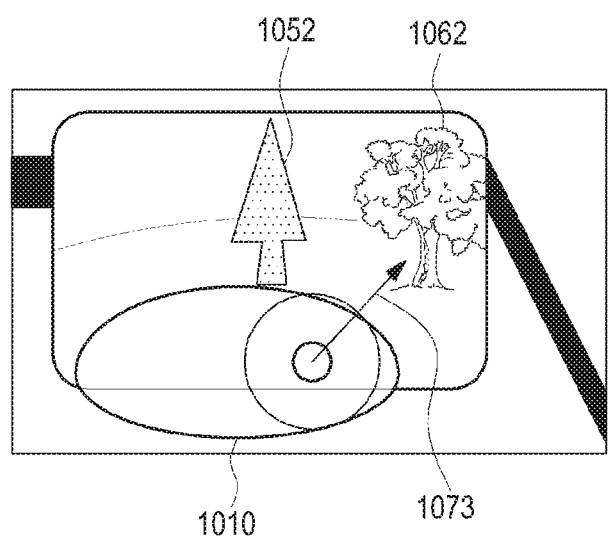
Figure 24C:
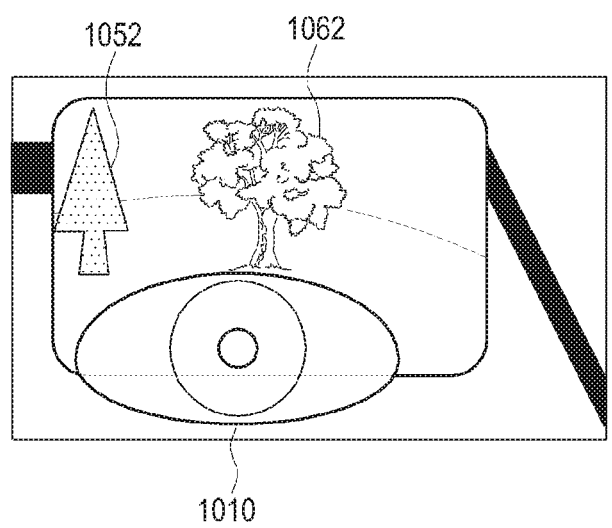

FIGS. 24A-24C illustrate a change of a focus object.

When an image with high visibility is displayed on the second window 285, an image placed in a location different from the intention of a user may be displayed due to an error in an angle of a detected gaze. When the image with high visibility is displayed, a movement of the gaze of a user is detected and a focus object is changed so as to display an image that meets the intention of the user.

Referring to FIG. 24A, even though the gaze 1072 of a user is actually directed towards a second object 1060, it is mistakenly determined that a gaze 1071 of the user is directed towards a first object 1050 due to an error in focus object determination.

Referring to FIG. 24B, the controller 290 mistakenly measures that the user focuses on the first object 1050, and displays an image with high visibility 1052 of the first object 1050 in the center of the second window 285.

Subsequently, the controller 290 tracks a gaze of the user, determines that a gaze 1073 of the user is directed towards an image with high visibility 1062 of the second object 1060, and changes the focus object.

Referring to FIG. 24C, the controller 290 changes the focus object, and displays the image with high visibility 1062 of the second object 1060 in the center of the second window 285.

Although the present embodiment tracks a gaze of a user, and corrects a provided object image based on an object that the user focuses on in the provided image, detailed adjustments of the provided image may be available based on a command of the user (a gesture, a voice, a touch, or the like), in addition to sensing a gaze of a user.

Figure 20A:
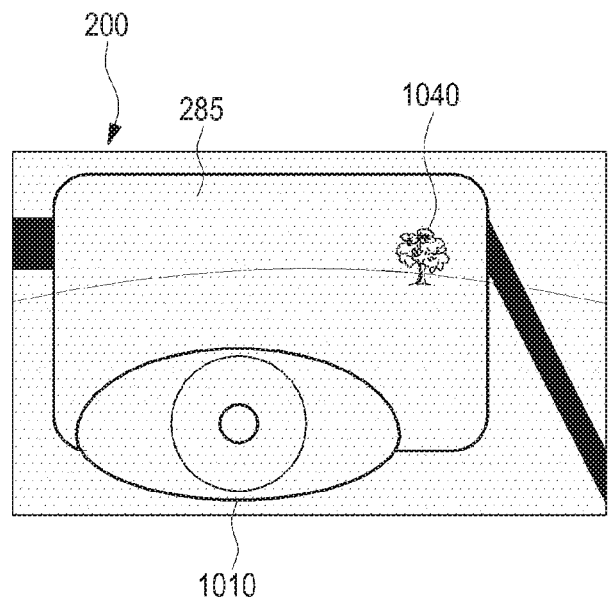
FIGS. 20A and 20B illustrate a method of displaying a high-visibility image according to a sixth embodiment of the present invention.
Figure 20B:
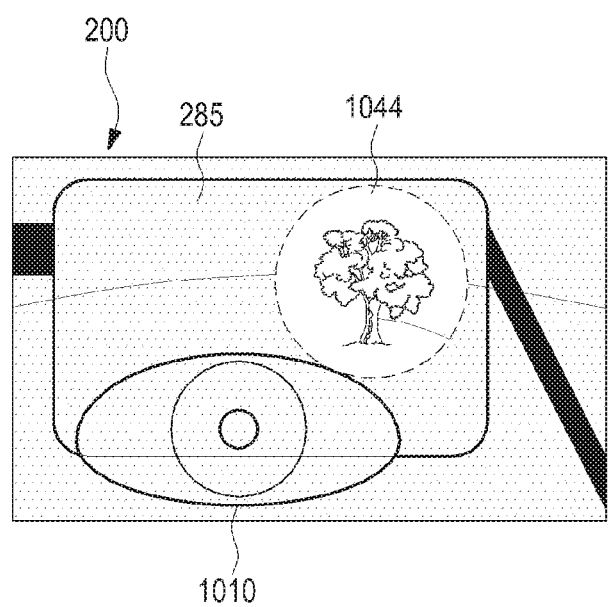

FIGS. 20A and 20B illustrate a method of displaying an image with high visibility according to a sixth embodiment of the present invention.

FIG. 20A illustrates that the user 1010 gazes at a dark focus object 1040 through the second window 285 of the second electronic device 200 during a dark night.

Referring to FIG. 20B, a brightly enlarged image 1044 of the focus object 1040 (that is, an image with high visibility) is displayed on the second window 285.

The controller 290 transmits an image of the focus object 1040 and related information (e.g., location information of the second electronic device 200 and pose (or compass direction or direction) information of the second electronic device 200, and/or the like) to the server 900, and displays the image with high visibility 1044 of the focus object 1040 received from the server 900.

In the above described examples, after displaying an image with high visibility to a user, returning to a previous screen may be executed by cancelling a focusing state. For example, when a user no longer gazes at a corresponding object, such as when a gaze of a user changes, when a user no longer frowns, or the like, the controllers 110 and 290 may display a screen which was displayed immediately before displaying an image with high visibility. In the case of a transparent touch screen or the second electronic device 200, the controllers 110 and 290 may interrupt the display of an image with high visibility.

FIGS. 21A and 21B illustrate a method of interrupting the display of an image with high visibility according to an embodiment of the present invention.

FIG. 21A illustrates an enlarged webpage 1110 which is an image with high visibility and is displayed on the touch screen 190 of the first electronic device 100.

Referring to FIG. 21B, when a user 1120 sighs 1122 and makes a sound such as 'Whew', the controller 110 displays a screen which was displayed immediately before displaying an image with high visibility, that is, a webpage 1112 before being enlarged. The controller 110 determines whether a focusing state is cancelled using a fricative sound created when the user's breath passes through the microphone 162 shown in FIG. 3.

Although the controllers 110 and 290 determine whether a user focuses on (or steadily gazes at) an object in the above described example, whether the user focuses on an object may be determined based on a command directly from the user, in addition to the determination based on a facial expression and a gazing time. It may be regarded as determining whether a user command is received instead of determining whether the user focuses on an object.

Figure 22:
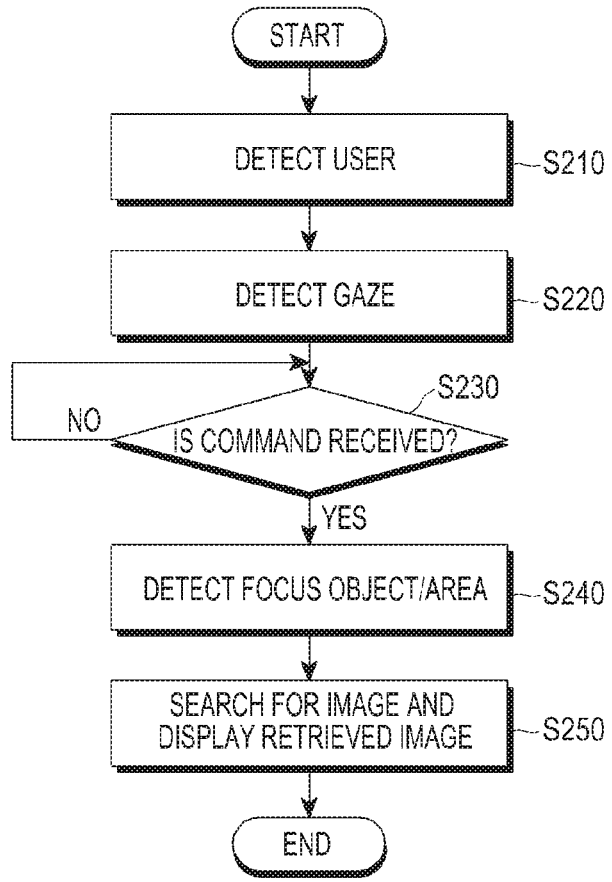
FIG. 22 is a flowchart illustrating a visibility improvement method using gaze tracking according to the second embodiment of the present invention.

FIG. 22 is a flowchart illustrating a visibility improvement method using gaze tracking according to a second embodiment of the present invention.

As a user detection step, the controller 110 detects a user through the first camera 151 or the first biometric sensor 171 in step S210. The controller 110 determines whether a subject included in an image photographed by the first camera 151 or the first biometric sensor 171 includes a face or a body part.

As a gaze detection step, the controller 110 detects the gaze of the user from the input image in step S220.

As a user command determination step, the controller 110 determines whether a user command is received in step S230.

The command may be provided through any means that transfers user intentions such as a voice, a touch, an input through a physical key/button, a user gesture, a motion of the first electronic device 100, a facial expression of a user, a breath of a user, a brainwave, and/or the like.

For example, the user may input a voice command such as "enlarge", "reduce", "brighten", or the like, and the controller 110 receives the voice command through the microphone 162 to enlarge, reduce, or brighten an image with high visibility for display. For reducing, the controller 110 displays an image with high visibility by reducing the image with high visibility to be smaller than a corresponding object, or reduces a currently displayed image with high visibility and displays the reduced image. For enlarging, the controller 110 additionally enlarges a currently displayed image with high visibility and displays the enlarged image.

For example, the controller 110 may display a button for instructing the display of an image with high visibility on the touch screen 190, or may map "enlarge" and "reduce" functions to the volume up button 161f and the volume down button 161g which are physical keys.

For example, the controller 200 may monitor whether a gesture set in advance is detected through the fourth camera 265. Examples of the gesture include, for example, assigning a focus object through a motion that indicates an object viewed through the window 280 and 285 with a finger, enlarging or reducing a focus object through a pinching motion of a finger (a motion of closing or opening fingers), and moving a virtual viewpoint through a motion that moves a finger back and forth (a motion that moves a finger to be close or distant to/from the second electronic device 200).

For example, the user makes a motion that moves the first electronic device 100 back and forth, or a motion that tilts the first electronic device 100. The controller 110 may sense a movement of the first electronic device 100 through the first sensor module 170. The controller 110 enlarges an image with high visibility and displays the enlarged image when the first electronic device 100 moves or is tilted in the forward direction (that is, a direction facing the user), and reduces an image with high visibility and displays the reduced image when the first electronic device 100 moves or is tilted in the backward direction (that is, a direction distant from the user).

For example, the first controller 110 may determine a degree of enlargement of the image with high visibility based on a degree of a frown on the user's face. Alternatively, when an image with high visibility is already displayed, the first controller 110 additionally enlarges the image with high visibility when the user further frowns, and reduces the image with high visibility when the user no longer frowns.

A virtual viewpoint may be determined based on a degree of a frown on a face. In the case where an image with high visibility is already displayed, when the user further frowns, the second controller 290 moves the virtual viewpoint to be closer or more distant than before.

When a user command is received, the controller 110 executes step S240, and when a user command is not received, the controller 110 periodically or continuously monitors whether a user command is received or not.

As a focus object/area detection step, the controller 110 determines an area (that is, a focus area) where a gaze of a user intersects an image surface, and detects an object that is located in the focus area in step S240.

As an image search and display step, the first controller 110 searches for an image with high visibility corresponding to a focus object, and displays the retrieved image in step S250. In this example, the controller 110 displays the retrieved image based on the user command of step S230.

Figure 23:
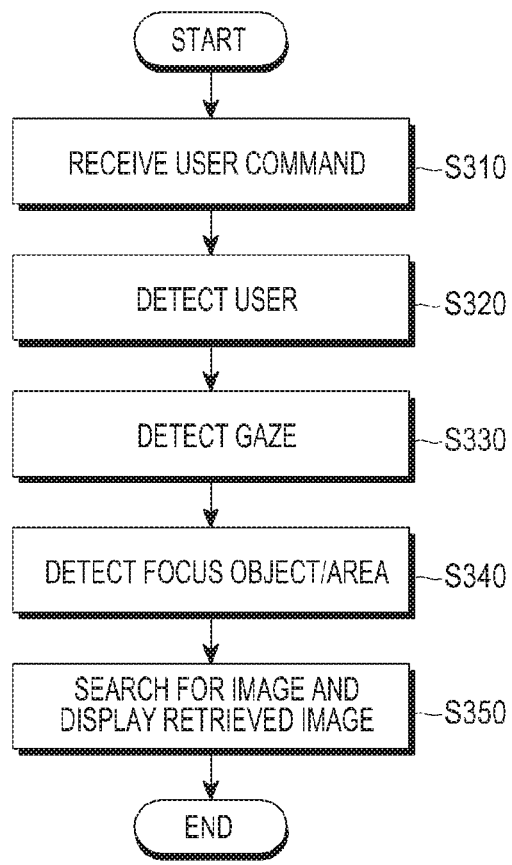
FIG. 23 is a flowchart illustrating a visibility improvement method using gaze tracking according to the third embodiment of the present invention.

FIG. 23 is a flowchart illustrating a visibility improvement method using gaze tracking according to the third embodiment of the present invention.

As a user command receiving step, the controller 110 receives a user command through any means that transfers a user intention such as a voice, a touch, an input through a physical key/button, a user gesture, a motion of the first electronic device 100, a facial expression of a user, a breath of a user, a brainwave, or the like, in step S310.

As a user detection step, the controller 110 detects a user through the first camera 151 or the first biometric sensor 171 in step S320.

As a gaze detection step, the controller 110 detects a gaze of the user from an input image, in step S330.

As a focus object/area detection step, the controller 110 determines an area (that is, a focus area) where the gaze of the user intersects an image surface, and detects an object located on the focus area, in step S340.

As an image search and display step, the controller 110 searches for an image with high visibility corresponding to a focus object, and displays the retrieved image in step 350. In this example, the first controller 110 displays the retrieved image based on the user command of step S310.

Although the touch screen has been illustrated as a representative example of the display unit displaying a screen in the above-described embodiments, a general display unit or a transparent display, such as a Liquid Crystal Display (LCD), an Organic Light Emitting Diode (OLED), and a Light Emitting Diode (LED), which do not have a touch detection function, may also be used instead of the touch screen.

Also, the first window 280 and the second window 285 of the second electronic device 200 may be a display unit(s) or a transparent display.

It will be appreciated that the embodiments of the present invention may be implemented in software, hardware, or a combination thereof. Any such software may be stored, for example, in a volatile or non-volatile storage device such as a ROM, a memory such as a RAM, a memory chip, a memory device, or an IC, or a optical or magnetic recordable and machine (e.g., computer) readable medium such as a CD, a DVD, a magnetic disk, or a magnetic tape, regardless of its ability to be erased or its ability to be re-recorded. It is appreciated that the storage unit included in the electronic device is one example of the machine-readable storage media suitable for storing a program or programs including commands for implementing various embodiments of the present invention. Accordingly, the present invention includes a program that includes a code for implementing an apparatus or a method defined in any claim in the present specification and a machine-readable storage medium that stores such a program. Further, the program may be electronically transferred by a predetermined medium such as a communication signal transferred through a wired or wireless connection, and the present invention appropriately includes equivalents of the program.

Although specific embodiments are described in the above description of the present invention, various modifications can be made without departing from the scope of the present invention. Accordingly, the scope of the present invention shall not be determined by the above-described embodiments, and is to be determined by the following claims and their equivalents.

What is claimed is:

1. A method of improving visibility by using gaze tracking, the method comprising:
    displaying a first image on a display of an electronic device, wherein the first image is a first view of a three-dimensional (3D) map including at least one of a front of a building, a rear of the building, or a side of the building;
    while the first image is displayed on the display of the electronic device, obtaining a gaze of a user by using a camera device;
    determining a first portion of the first image, based on a dwell time of the gaze of the user;
    receiving a second image from a server, wherein a second portion of the second image has higher visibility than visibility of the first portion of the first image based on the first portion of the first image, wherein the second image is a second view of the 3D map;
    displaying, on the display of the electronic device, the second image received from the server, wherein the higher visibility of the second portion of the second image includes at least one of a higher resolution, a higher definition, or a higher brightness than at least one of a corresponding resolution, a corresponding definition, or a corresponding brightness of the first portion of the first image; and
    while the second image is displayed on the display of the electronic device, determining a movement of a virtual viewpoint of the user based on the gaze of the user.

2. The method of claim 1, further comprising:
    detecting an eye of the user by using the camera device, wherein the gaze is detected based on a position of a pupil of the eye of the user.

3. The method of claim 1, further comprising:
    determining whether the user focuses on the first portion of the first image displayed on the display.

4. The method of claim 3, wherein determining whether the user focuses on the first portion of the first image comprises determining whether the user focuses on the first portion of the first image based on a facial expression of the user or a change in a pupil of an eye of the user.

5. The method of claim 1, wherein the second portion of the second image is enlarged and a degree of enlargement of the second portion of the second image is based on a degree of a frown on a face of the user; or
    wherein the virtual viewpoint is determined based on the degree of the frown on the face of the user.

6. The method of claim 1, further comprising:
    receiving a command of the user,
    wherein the obtaining comprises obtaining the gaze based on the command of the user.

7. The method of claim 1, further comprising:
    receiving a command of the user,
    wherein determining the first portion of the first image comprises determining the first portion of the first image based on the command of the user.

8. The method of claim 1, wherein the first image is acquired by photographing cities or streets.

9. The method of claim 1, wherein the first image and the second image are acquired from a map database of the server.

10. An electronic device for improving visibility using gaze tracking, comprising:
    a camera;
    a display;
    a communication interface;
    at least one memory storing instructions; and
    at least one processor configured to execute the instructions to:
        control the display to display a first image on the display, wherein the first image is a three-dimensional (3D) map including at least one of a front of a building, a rear of the building, or a side of the building,
        while the first image is displayed on the display, control the camera to obtain a gaze of a user;
        determine a first portion of the first image, based on a dwell time of the gaze of the user,
        control the communication interface to receive a second image from a server, wherein a second portion of the second image has higher visibility than visibility of the first portion of the first image, wherein the second image is a second view of the 3D map,
        control the display to display the second image received from the server, wherein the higher visibility of the second portion of the second image includes at least one of a higher resolution, a higher definition, or a higher brightness than at least one of a corresponding resolution, a corresponding definition, or a corresponding brightness of the first portion of the first image, and
        while the second image is displayed on the display control to determine a movement of a virtual viewpoint of the user based on the gaze of the user.

11. The electronic device of claim 10, wherein the at least one processor is further configured to:
    control the camera to detect an eye of the user,
    wherein the gaze of the user is detected based on a position of a pupil of the eye of the user.

12. The electronic device of claim 10, wherein the at least one processor is further configured to:
    determine whether the user focuses on the first portion of the first image displayed on the display.

13. The electronic device of claim 10, wherein the at least one processor is further configured to:
    determine whether the user focuses on the first portion of the first image based on a facial expression of the user or a change in a pupil of an eye of the user.

14. The electronic device of claim 10, wherein the second portion of the second image is enlarged and a degree of enlargement of the second portion of the second image is based on a degree of a frown of a face of the user or the virtual viewpoint is determined based on the degree of the frown of the face of the user.

15. The electronic device of claim 10, wherein the at least one processor is further configured to:
    control to receive a command of the user,
    wherein the at least one processor controls the camera to obtain the gaze of the user based on the command of the user.

16. The electronic device of claim 10, wherein the at least one processor is further configured to:

control to receive a command of the user,
wherein the at least one processor controls to determine the first portion of the first image based on the command of the user.

17. The electronic device of claim 10, wherein the first image is an image acquired by photographing cities or streets.

18. The electronic device of claim 10, wherein the first image and the second image acquired from a map database of the server.

19. A system for improving visibility using gaze tracking, the system comprising:
a first device, comprising:
a display;
a first communication interface;
at least one first memory storing first instructions; and
at least one first processor configured to execute the first instructions to:
control the display to display a first image on the display, wherein the first image is a three-dimensional (3D) map including at least one of a front of a building, a rear of the building, or a side of the building,
while the first image is displayed on the display, control a camera device coupled to the first device to obtain a gaze of a user,
determine a first portion of the first image, based on a dwell time of the gaze of the user,
control the first communication interface to transmit information regarding the first portion of the first image towards a second device,
control the first communication interface to receive, from the second device, a second image, wherein a second portion of the second image has higher visibility than visibility of the first portion of the first image, wherein the second image is a second view of the 3D map;
control the display to display the second image obtained from the second device,
wherein the higher visibility of the second portion of the second image includes at least one of a higher resolution, a higher definition, or a higher brightness than at least one of a corresponding resolution, corresponding definition, or a corresponding brightness of the first portion of the first image; and the second device, the second device comprising:
a second communication interface,
at least one second memory storing second instructions, and
at least one second processor configured to execute the second instructions to:
control the second communication interface to receive the information regarding the first portion of the first image, wherein the first portion of the first image being determined, by using the camera device coupled to the first device, based on the dwell time of the gaze of the user,
control the second communication interface to transmit the second image to the first device based on the information regarding the first portion of the first image.

20. The system of claim 19, wherein the at least one first processor is further configured to:
control the camera device to detect an eye of the user,
wherein the gaze of the user is detected based on a position of a pupil of the eye of the user.

21. The system of claim 19, wherein the at least one first processor is further configured to:
determine whether the user focuses on the first portion of the first image displayed on the display.

22. The system of claim 21, wherein the at least one first processor is further configured to:
determine whether the user focuses on the first portion of the first image based on a facial expression of the user or a change in a pupil of an eye of the user.

23. The system of claim 19, wherein the second portion of the second image is enlarged and a degree of enlargement of the second portion of the second image is based on a degree of a frown of a face of the user or the virtual viewpoint is determined based on the degree of the frown of the face of the user.

24. The system of claim 19, wherein the at least one first processor is further configured to:
control to receive a command of the user,
wherein the at least one first processor controls the camera device to obtain the gaze of the user based on the command of the user.

25. The system of claim 19, wherein the at least one first processor is further configured to:
control to receive a command of the user,
wherein the at least one processor controls to determine the first portion of the first image based on the command of the user.

26. The system of claim 19, wherein the first image and the second image are acquired by photographing cities streets.

27. The system of claim 19, wherein the first image and the second image are acquired from a map database of the second device.

* * * * *